US012730507B2

(12) United States Patent
Taniguchi et al.

(10) Patent No.: US 12,730,507 B2
(45) Date of Patent: Sep. 8, 2026

(54) INFORMATION PROCESSING APPARATUS, INFORMATION PROCESSING METHOD, AND STORAGE MEDIUM

(71) Applicant: SONY GROUP CORPORATION, Tokyo (JP)

(72) Inventors: Keiichiro Taniguchi, Tokyo (JP); Sayaka Yamazaki, Tokyo (JP); Masayuki Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 28 days.

(21) Appl. No.: 18/847,906

(22) PCT Filed: Mar. 3, 2023

(86) PCT No.: PCT/JP2023/008152

§ 371 (c)(1),
(2) Date: Sep. 17, 2024

(87) PCT Pub. No.: WO2023/181862

PCT Pub. Date: Sep. 28, 2023

(65) Prior Publication Data

US 2025/0199608 A1 Jun. 19, 2025

(30) Foreign Application Priority Data

Mar. 25, 2022 (JP) ................................ 2022-050278

(51) Int. Cl.
*G06F 3/01* (2006.01)
*G06V 40/18* (2022.01)
(Continued)

(52) U.S. Cl.
CPC .............. *G06F 3/013* (2013.01); *G06F 3/017* (2013.01); *G06V 40/197* (2022.01); *H04N 23/611* (2023.01); *H04N 23/62* (2023.01)

(58) Field of Classification Search
CPC G06F 3/013; G06F 3/017; G06F 3/01; G06V 40/197; G06V 40/16; G06V 40/18;
(Continued)

(56) References Cited

U.S. PATENT DOCUMENTS 9,703,373 B2 * 7/2017 Kohlhoff ................ G06V 40/19
2010/0074477 A1 * 3/2010 Fujii ...................... G06V 40/19
348/78
2022/0050696 A1 * 2/2022 Presant .................. G06Q 10/00

FOREIGN PATENT DOCUMENTS

JP 10-207615 A 8/1998
JP 2005293061 A * 10/2005
(Continued)

OTHER PUBLICATIONS

International Search Report and Written Opinion of PCT Application No. PCT/JP2023/008152, issued on May 23, 2023, 09 pages of ISRWO.

*Primary Examiner* — Brian P Yenke
*Assistant Examiner* — Omer Khalid
(74) *Attorney, Agent, or Firm* — CHIP LAW GROUP

(57) ABSTRACT

An information processing apparatus includes a registration information acquisition unit that acquires registration information in which a motion determined from shapes of an eye and a periphery of the eye and processing are associated with each other, an image acquisition unit that acquires an image of the eye and the periphery of the eye, a processing selection unit that selects processing included in the registration information on the basis of the registration information and the image, and a control unit that performs control such that the processing selected by the processing selection unit is performed.

16 Claims, 17 Drawing Sheets

(51) Int. Cl.
*H04N 23/611* (2023.01)
*H04N 23/62* (2023.01)

(58) Field of Classification Search
CPC ...... H04N 23/611; H04N 23/62; H04N 23/69; G03B 7/00; G03B 15/00; G03B 17/02; G06T 7/00; G06T 7/20
USPC .......................................................... 348/78
See application file for complete search history.

(56) References Cited

FOREIGN PATENT DOCUMENTS

| | | | |
|---|---|---|---|
| JP | 2013-003647 | A | 1/2013 |
| JP | 2017-528793 | A | 9/2017 |
| JP | 2021-184232 | A | 12/2021 |

* cited by examiner

FIG. 3

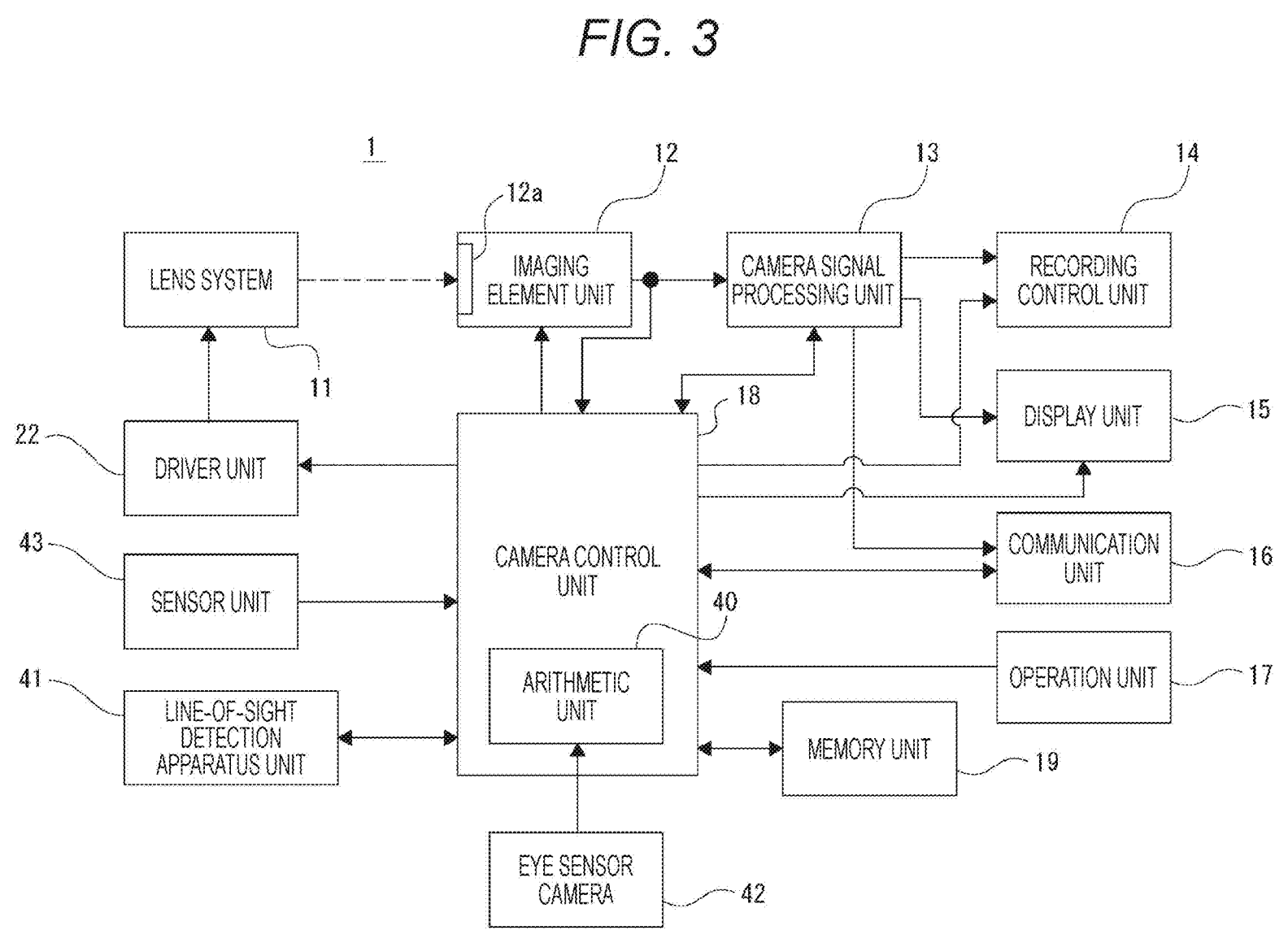

1
LENS SYSTEM 11
IMAGING ELEMENT UNIT 12
12a
CAMERA SIGNAL PROCESSING UNIT 13
RECORDING CONTROL UNIT 14
DISPLAY UNIT 15
COMMUNICATION UNIT 16
OPERATION UNIT 17
CAMERA CONTROL UNIT 18
MEMORY UNIT 19
ARITHMETIC UNIT 40
DRIVER UNIT 22
SENSOR UNIT 43
LINE-OF-SIGHT DETECTION APPARATUS UNIT 41
EYE SENSOR CAMERA 42

FIG. 6

REGISTRATION INFORMATION

| REGISTRATION MOTION | REGISTRATION PROCESSING |
| --- | --- |
| STRONGLY CLOSING EYES | SHUTTER |
| WINK | AF |
| STARTLE | AE |
| SMILE | PEAKING ASSIST |
| FROWN | ZOOM-IN |

FIG. 7

REGISTRATION INFORMATION

PERSONAL IDENTIFICATION INFORMATION (USER U1)

| REGISTRATION MOTION | REGISTRATION PROCESSING |
|---|---|
| STRONGLY CLOSING EYES | SHUTTER |
| WINK | AF |
| STARTLE | AE |
| SMILE | PEAKING ASSIST |
| FROWN | ZOOM-IN |

PERSONAL IDENTIFICATION INFORMATION (USER U2)

| REGISTRATION MOTION | REGISTRATION PROCESSING |
|---|---|
| SQUINTING EYES | DETERMINATION |
| FROWN | SHUTTER |
| CLOSING EYES | CONTINUOUS SHOOTING |
| APPLYING FORCE TO EYES | ZOOM-IN |
| OPENING EYES | ZOOM-OUT |

FIG. 9
LEFT EYE RIGHT EYE
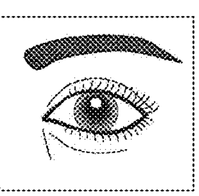
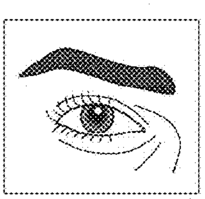
OPENING NORMAL CLOSING STRONGLY CLOSING
DEGREE OF OPENING OF EYES
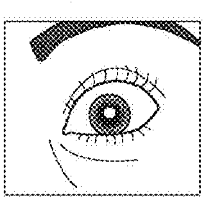
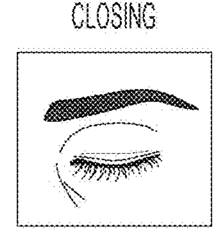
POSITION (DIRECTION, ROTATION)
NORMAL XY DIRECTION SHIFT Z DIRECTION SHIFT
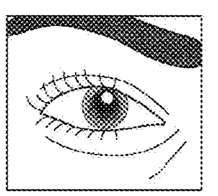
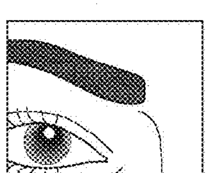
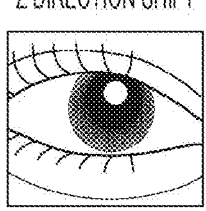
DOWNWARD UPWARD SIDEWAYS
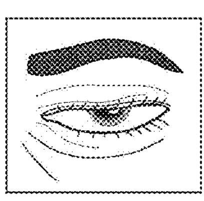
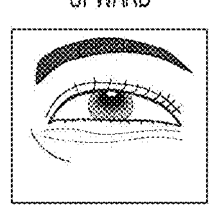
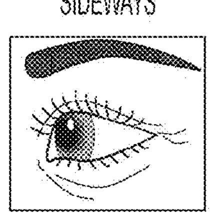
VERTICAL/HORIZONTAL
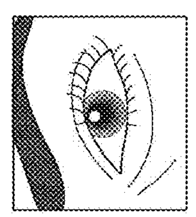

FIG. 10

| REGISTRATION MOTION | THRESHOLD VALUE (%) | MATCHING DEGREE OF MOTION (%) |
|---|---|---|
| STRONGLY CLOSING EYES | 70 | 0 |
| WINK | 80 | 20 |
| STARTLE | 60 | 80 |
| SMILE | 80 | 30 |
| FROWN | 70 | 10 |

FIG. 11

| REGISTRATION MOTION | THRESHOLD VALUE (%) | MATCHING DEGREE OF MOTION (%) |
|---|---|---|
| STRONGLY CLOSING EYES | 70 | 80 |
| WINK | 80 | 70 |
| STARTLE | 60 | 10 |
| SMILE | 80 | 40 |
| FROWN | 70 | 80 |

FIG. 12

| REGISTRATION MOTION | THRESHOLD VALUE (%) | MATCHING DEGREE OF MOTION (%) |
|---|---|---|
| STRONGLY CLOSING EYES | 70 | 20 |
| WINK | 80 | 30 |
| STARTLE | 60 | 10 |
| SMILE | 80 | 40 |
| FROWN | 70 | 30 |

FIG. 18C
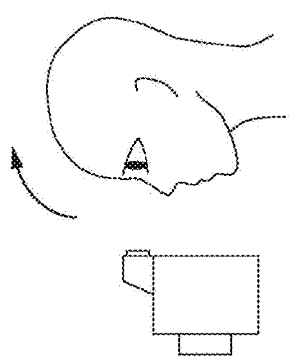
FIG. 18B
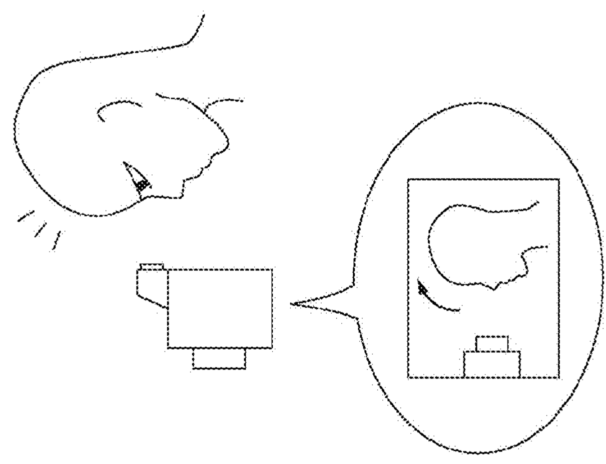
FIG. 18A

INFORMATION PROCESSING APPARATUS, INFORMATION PROCESSING METHOD, AND STORAGE MEDIUM

CROSS REFERENCE TO RELATED APPLICATIONS

This application is a U.S. National Phase of International Patent Application No. PCT/JP2023/008152 filed on Mar. 3, 2023, which claims priority benefit of Japanese Patent Application No. JP 2022-050278 filed in the Japan Patent Office on Mar. 25, 2022. Each of the above-referenced applications is hereby incorporated herein by reference in its entirety.

TECHNICAL FIELD

The present technology relates to an information processing apparatus, an information processing method, and a storage medium, and particularly relates to a technical field of a user interface.

BACKGROUND ART

For example, in the field of imaging apparatuses, there is known an apparatus that recognizes a facial expression such as a smile, a motion of closing an eye, or the like as a shutter operation or the like and performs shutter processing.

Patent Document 1 below discloses an information processing apparatus in which a user can perform an input operation without using a hand.

CITATION LIST

Patent Document

Patent Document 1: Japanese Patent Application Laid-Open No. 2013-3647

SUMMARY OF THE INVENTION

Problems to be Solved by the Invention

When an image is captured by an imaging apparatus (camera), there is a situation where both hands cannot be used such as one-handed holding. For example, in a single-lens reflex camera or the like, since the camera body is generally held with the left hand and operated with the right hand, it is difficult to capture an image unless both hands are used.

In addition, it is difficult for a person with a handicap in one hand to operate the camera.

By using a facial expression, an eye closing motion, or the like as an operation as in Patent Document 1, for example, a shutter operation can be performed even in a situation where a hand cannot be used, but it is difficult to realize various operations and processing.

There is also a technology of recognizing an operation by voice input, but there are many situations where a voice cannot be output at the time of shooting.

Therefore, the present technology proposes a technology that enables execution of various types of processing by selecting processing on the basis of the shapes of the user's eyes and the periphery of the eyes obtained as an image.

Solutions to Problems

An information processing apparatus according to the present technology includes: a registration information acquisition unit that acquires registration information in which a motion determined from shapes of an eye and a periphery of the eye and processing are associated with each other; an image acquisition unit that acquires an image of the eye and the periphery of the eye; a processing selection unit that selects the processing included in the registration information on the basis of the registration information and the image; and a control unit that performs control such that the processing selected by the processing selection unit is performed.

The image of the eye and the periphery of the eye is acquired, and the motion expressed by the eye and the periphery of the eye is determined. The motion includes not only the motion of the eye itself but also the motion of the periphery of the eye (for example, eyebrows and wrinkles), the change in the position of the eye due to the motion of the neck, and the like. Then, processing is selected from the registration information in which the motion and the processing are associated with each other, and the processing is controlled to be executed.

BRIEF DESCRIPTION OF DRAWINGS

FIG. 3 is a block diagram of the imaging apparatus according to the embodiment.

FIG. 6 is an explanatory diagram of registration information according to the embodiment.

FIG. 7 is an explanatory diagram of registration information according to the embodiment.

FIG. 9 is an explanatory diagram of eye motion recognized in the embodiment.

FIG. 10 is an explanatory diagram of an example of determination based on a matching degree of motions according to the embodiment.

FIG. 11 is an explanatory diagram of an example of determination based on a matching degree of motions according to the embodiment.

FIG. 12 is an explanatory diagram of an example of determination based on a matching degree of motions according to the embodiment.

FIGS. 18A, 18B, and 18C are explanatory diagrams of a notification example in the embodiment.

MODE FOR CARRYING OUT THE INVENTION

Hereinafter, embodiments will be described in the following order.

<1. Application Apparatus Example>
<2. Configuration Example of Imaging Apparatus>
<3. Configuration Example of Information Processing Apparatus>
<4. Functional Configuration and Registration Information of Arithmetic Unit>
<5. First Embodiment>
<6. Second Embodiment>
<7. Third Embodiment>
<8. Fourth Embodiment>
<9. Fifth Embodiment>
<10. Motion and Processing in Each Embodiment>
<11. Conclusion and Modifications>

Note that in the present disclosure, "images" include both moving images and still images. In particular, in the case for distinction, an image is described as "still image" or "moving image".

In addition, the "images" refer to images actually displayed on a screen, but "images" in a signal processing process or a transmission path until being displayed on the screen refer to image data.

1. Application Apparatus Example

First, a specific apparatus example assumed as an information processing apparatus of the present disclosure will be described.

An information processing apparatus of the present disclosure is an apparatus capable of performing information processing, and is specifically an apparatus that includes a microprocessor or the like, selects processing to be executed on the basis of an image obtained by imaging the user's eyes and the periphery of the eyes, and can execute the selected processing.

Note that, hereinafter, an image obtained by imaging the user's eyes and the periphery of the eyes is also referred to as an "eye peripheral image". In the embodiment, the "eye peripheral image" means an image including eyes, and wrinkles around the eyes, eyebrows, and the like.

As a specific example of selecting the processing to be executed on the basis of the eye peripheral image, first, the "motion" by the eye and the periphery of the eye is determined from the image. Then, it is conceivable to select "processing" associated with the determined "motion" as processing to be executed.

For example, a processor itself such as a CPU or a DSP that performs such processing, or a device including such a processor is the information processing apparatus in the present disclosure.

Figure 1:
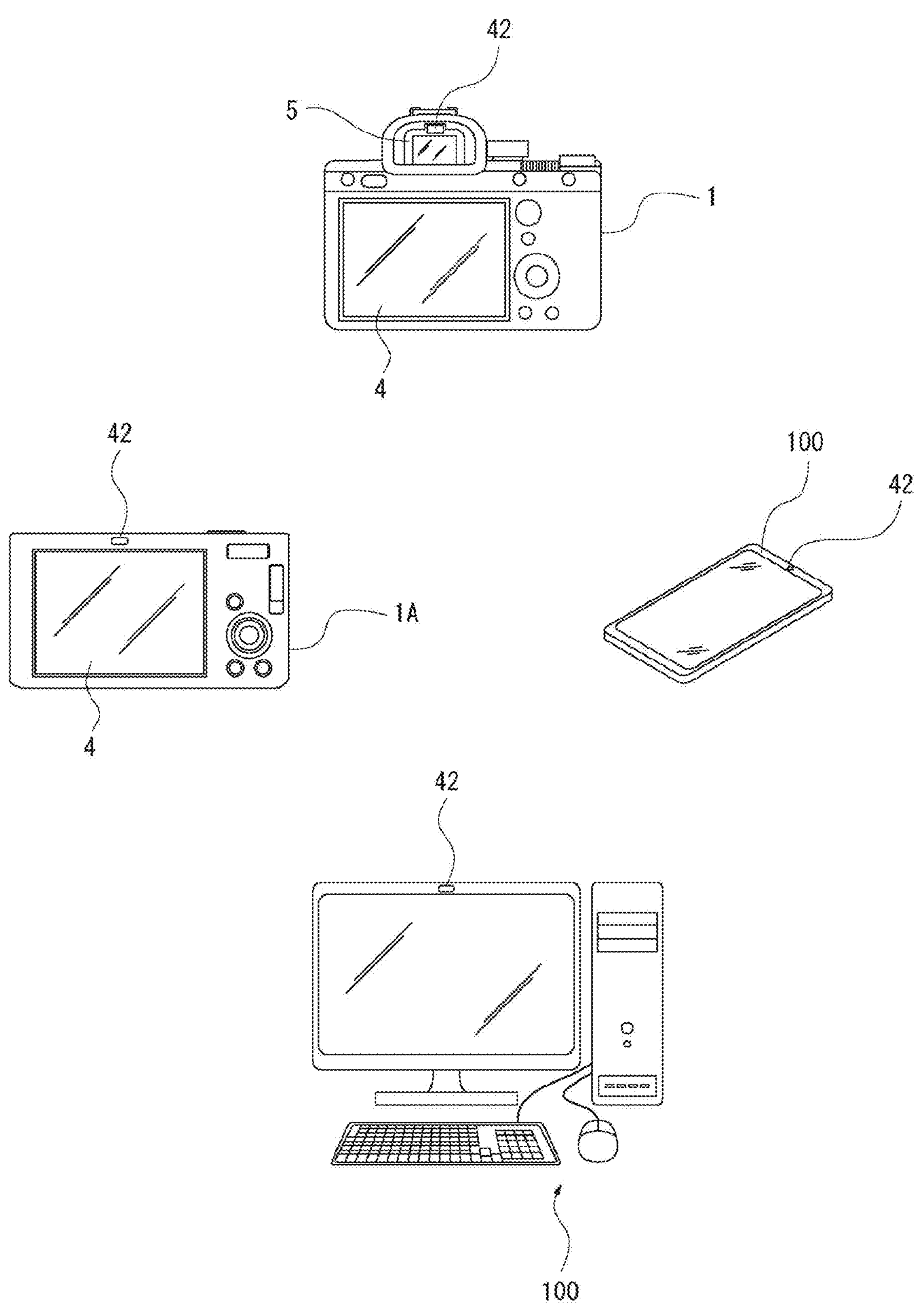
FIG. 1 is an explanatory diagram of an application apparatus example of an information processing apparatus according to an embodiment of the present technology.

FIG. 1 illustrates imaging apparatuses 1 and 1A and a terminal apparatus 100 as specific apparatus examples corresponding to the information processing apparatus.

The imaging apparatus 1 illustrates a camera including a viewfinder such as an electric viewfinder (EVF) 5, and the imaging apparatus 1A is a so-called compact type camera not including a viewfinder.

Examples of the terminal apparatus 100 include a smartphone and a personal computer (PC). As the terminal apparatus 100, a tablet apparatus or the like is also assumed.

In these various apparatuses, an imaging apparatus referred to as an "eye sensor camera 42" for description is mounted at a required position, and images the periphery of the user's eye so that an eye peripheral image can be obtained.

In the case of the imaging apparatus 1, a configuration is assumed in which the eye sensor camera 42 is provided near the EVF 5 and images the eye of the user looking into the EVF 5 and the periphery of the eye.

In the case of the imaging apparatus 1A without a viewfinder, for example, a configuration is assumed in which the eye sensor camera 42 is provided at a peripheral position of the rear monitor 4 and images the eye and the periphery of the eye of the user viewing the rear monitor 4.

In the case of the terminal apparatus 100 such as a smartphone or a PC, a configuration is assumed in which the eye sensor camera 42 is provided at a peripheral position of the screen and images the eye and the periphery of the eye of the user viewing the screen.

For example, as described above, a configuration in which the eye sensor camera 42 is mounted in various devices is assumed. In this case, the internal processor apparatus acquires the image captured by the eye sensor camera 42, that is, the eye peripheral image, selects the processing included in the registration information using the eye peripheral image and the registration information, and executes the selected processing.

The devices illustrated in FIG. 1 are merely examples. The technology of the present disclosure can be applied to a device that captures an eye peripheral image and performs processing based on the image. For example, devices corresponding to the information processing apparatus of the present disclosure are extremely diverse, such as a television receiver, a game device, a personal computer, a workstation, a head-mounted display device, a robot, a monitoring apparatus, and a sensor apparatus.

2. Configuration Example of Imaging Apparatus

A configuration example of the imaging apparatus 1 as an example of the information processing apparatus of the present disclosure will be described.

Figure 2:
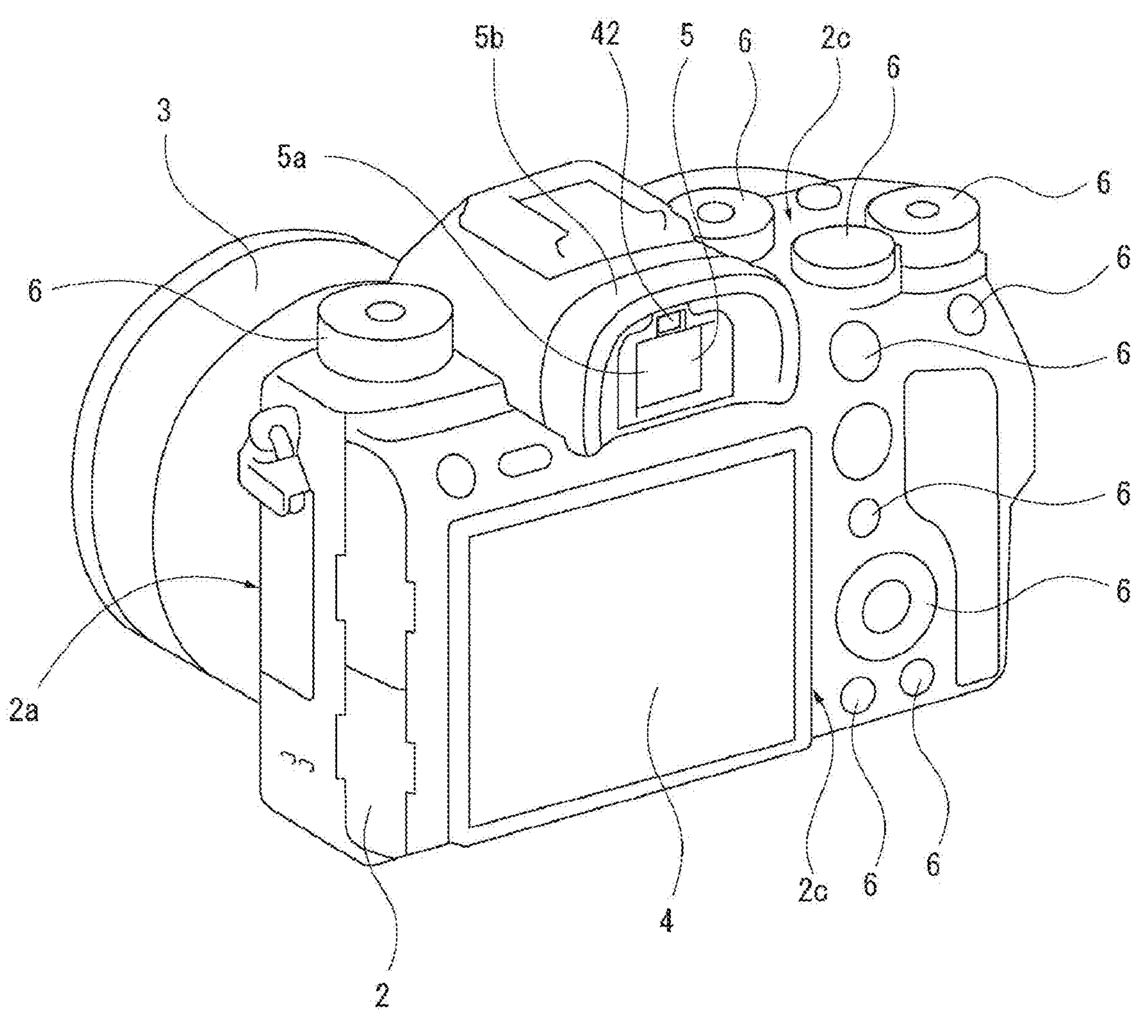
FIG. 2 is a perspective view of an imaging apparatus according to the embodiment.

FIG. 2 is a perspective view of the imaging apparatus 1 as viewed from the back side. Note that, for the sake of description, the subject side is referred to as front (front side), and the imaging person side is referred to as a rear (back side).

The imaging apparatus 1 includes a camera housing 2 and a lens barrel 3 that is attachable to and detachable from the camera housing 2 and is attached to a front surface portion 2*a*. Note that the lens barrel 3 that is detachable as a so-called interchangeable lens is an example, and the lens barrel 3 may be a lens barrel that cannot be detached from the camera housing 2.

A rear monitor 4 is disposed on a back surface portion 2*b* of the camera housing 2. The rear monitor 4 displays a live view image, a reproduced image of a recorded image, or the like.

The rear monitor 4 includes, for example, a display device such as a liquid crystal display (LCD) or an organic electro-luminescence (EL) display.

An EVF 5 is disposed on an upper surface portion 2*c* of the camera housing 2. The EVF 5 includes an EVF monitor 5*a* and a frame-shaped enclosure portion 5*b* projecting backward so as to surround upper and left and right sides of the EVF monitor 5*a*.

The EVF monitor 5*a* is formed with an LCD, an organic EL display, or the like. Note that an optical view finder (OVF) may be provided instead of the EVF monitor 5*a*.

As described above, the eye sensor camera 42 is disposed in the vicinity of the EVF 5, for example, inside the enclosure portion 5*b*, and captures the eye peripheral image of the user looking into the EVF 5.

Various operation elements 6 are provided on the back surface portion 2*b* and the upper surface portion 2*c*. Examples thereof include a shutter button, a playback menu activation button, an enter button, a cross key, a cancel button, a zoom key, and a slide key. These operation elements 6 include various forms such as a button, a dial, a pressing and rotatable composite operation element, and the like. With the various forms of the operation elements 6, for example, a shutter operation, a menu operation, a reproduction operation, a mode selection/switching operation, a focus operation, a zoom operation, and selection/setting of parameters such as a shutter speed and an F-number can be performed.

An internal configuration of the imaging apparatus 1 is illustrated in FIG. 3.

The imaging apparatus 1 includes, for example, a lens system 11, an imaging element unit 12, a camera signal processing unit 13, a recording control unit 14, a display unit 15, a communication unit 16, an operation unit 17, a camera control unit 18, a memory unit 19, a driver unit 22, a line-of-sight detection apparatus unit 41, an eye sensor camera 42, and a sensor unit 43.

The lens system 11 includes lenses such as a zoom lens, and a focus lens, an aperture mechanism, and the like. Light (incident light) from a subject is guided by the lens system 11 and condensed on the imaging element unit 12.

The imaging element unit 12 includes, for example, an image sensor 12*a* (imaging element) of a complementary metal oxide semiconductor (CMOS) type, a charge coupled device (CCD) type, or the like.

The imaging element unit 12 performs, for example, correlated double sampling (CDS) processing, automatic gain control (AGC) processing, and the like on an electrical signal obtained by photoelectrically converting the light received by the image sensor 12*a*, and further performs analog/digital (A/D) conversion processing on the electrical signal. Then, an imaging signal as digital data is output to the camera signal processing unit 13 and the camera control unit 18 in the subsequent stage.

The camera signal processing unit 13 is configured as, for example, an image processing processor with a digital signal processor (DSP) or the like. The camera signal processing unit 13 performs various types of signal processing on a digital signal (captured image signal) from the imaging element unit 12. For example, as a camera process, the camera signal processing unit 13 performs preprocessing, synchronization processing, YC generation processing, resolution conversion processing, and the like.

Then, the camera signal processing unit 13 performs, for example, compression encoding for recording or communication, formatting, generation or addition of metadata, and the like on the image data subjected to the above-described various processes, and generates a file for recording or communication.

For example, an image file in a format such as joint photographic experts group (JPEG), tagged image file format (TIFF), or graphics interchange format (GIF) is generated as a still image file. Furthermore, it is also conceivable to generate an image file in an MP4 format or the like used for recording a moving image and sound conforming to MPEG-4.

Note that it is also conceivable to generate an image file as raw image data.

The recording control unit 14 performs, for example, recording and replay on a recording medium using a non-volatile memory. The recording control unit 14 performs processing of recording, for example, image files such as moving image data and still image data, and metadata including thumbnail images and the like on a recording medium.

Actual forms of the recording control unit 14 can be diversely considered. For example, the recording control unit 14 may be configured as a flash memory built in the imaging apparatus 1 and a write/read circuit thereof. Furthermore, the recording control unit 14 may be in a form of a card recording/replaying unit configured to perform recording/replaying access to a recording medium detachable from the imaging apparatus 1, for example, a memory card (portable flash memory or the like). Furthermore, the recording control unit 14 may be implemented as a hard disk drive (HDD) or the like as a form built in the imaging apparatus 1.

The display unit 15 is a display unit that performs various displays for the imaging person, and is, for example, a display device such as a liquid crystal panel (liquid crystal display (LCD)) or an organic electro-luminescence (EL) display as the rear monitor 4 or the EVF 5 disposed in the housing of the imaging apparatus 1.

The display unit 15 executes various displays on a display screen on the basis of an instruction from the camera control unit 18. For example, the display unit 15 displays a reproduced image of image data read from the recording medium in the recording control unit 14.

Furthermore, there is a case where image data of a captured image whose resolution has been converted for display by the camera signal processing unit 13 is supplied to the display unit 15, and the display unit 15 performs a display on the basis of the image data of the captured image in accordance with an instruction from the camera control unit 18. As a result, a so-called through image (live view image of the subject), which is a captured image during composition confirmation, moving image recording, or the like, is displayed.

Furthermore, the display unit 15 performs displays of various operation menus, icons, messages, and the like, that is, graphical user interfaces (GUIs) on the screen on the basis of an instruction from the camera control unit 18.

The communication unit 16 performs data communication and network communication with an external device in a wired or wireless manner. For example, captured image data (still image file or moving image file) or metadata is transmitted and output to an external information processing apparatus, display apparatus, recording apparatus, reproduction apparatus, or the like.

Furthermore, the communication unit 16 as a network communication unit can perform communication using various networks, for example, the Internet, a home network, a local area network (LAN), and the like, and transmit and receive various types of data to and from a server, a terminal, and the like on the network.

Furthermore, the imaging apparatus 1 may be capable of mutually performing information communication with a PC, a smartphone, a tablet terminal, a headphone, an earphone, a headset, or the like by using the communication unit 16, for example, Bluetooth (registered trademark), Wi-Fi communication, near field communication such as NFC, or infrared communication.

Furthermore, the imaging apparatus 1 and another device may be capable of communicating with each other using wired connection communication.

The operation unit 17 collectively indicates input devices provided for the user to perform various operation inputs. Specifically, the operation unit 17 represents various operation elements (a key, a dial, a touch panel, a touch pad, and the like) provided in the housing of the imaging apparatus 1. For example, it is assumed that the touch panel is provided on the surface of the rear monitor 4.

An operation of the user is detected by the operation unit 17, and a signal corresponding to the input operation is transmitted to the camera control unit 18.

The line-of-sight detection apparatus unit 41 is a device for detecting a user's line of sight, and includes, for example, an infrared LED that emits infrared rays to the user's eyes, an infrared camera that images the user's eyes, and the like.

For example, such a line-of-sight detection apparatus unit 41 is arranged in the EVF 5 illustrated in FIG. 2, and sends the captured image of the infrared camera to the camera control unit 18, so that the line-of-sight direction of the user who looks into the EVF 5 can be detected. Furthermore, such a line-of-sight detection apparatus unit 41 may be arranged in the vicinity of the rear monitor 4 so as to be able to perform imaging for detecting the line-of-sight direction of the user viewing the rear monitor 4.

Note that, as the embodiment, a configuration example without the line-of-sight detection apparatus unit 41 is also assumed.

The eye sensor camera 42 is provided in the EVF 5, for example, as described above, and images the user's eyes and the periphery of the eyes.

The eye sensor camera 42 includes, for example, a visible-light image sensor and an imaging signal processing circuit, and obtains, for example, still image data or moving image data as a color image or a monochrome image. That is, the still image and the moving image are eye peripheral images. The eye peripheral image captured by the eye sensor camera 42 is sent to the camera control unit 18.

The camera control unit 18 is configured using a microcomputer including a central processing unit (CPU).

The memory unit 19 stores information and the like used for processing by the camera control unit 18. The illustrated memory unit 19 comprehensively indicates, for example, a read only memory (ROM), a random access memory (RAM), a flash memory, and the like.

The memory unit 19 may be a memory area provided in a microcomputer chip serving as the camera control unit 18 or may be a separate memory chip.

The camera control unit 18 executes a program stored in the ROM, the flash memory, or the like of the memory unit 19 to control the entire imaging apparatus 1.

For example, the camera control unit 18 controls the motion of each necessary unit with respect to the control of the shutter speed of the imaging element unit 12, the instruction of various signal processing in the camera signal processing unit 13, the imaging motion and the recording motion according to the user's operation, the reproduction motion of the recorded image file, the motion of the lens system 11 such as zooming, focusing, and aperture adjustment in the lens barrel, the user interface motion, and the like.

Furthermore, in a case where the line-of-sight detection apparatus unit 41 is provided, the camera control unit 18 can perform line-of-sight direction detection processing of the user on the basis of the infrared captured image from the line-of-sight detection apparatus unit 41. Then, the camera control unit 18 can also perform various types of control on the basis of the detected line-of-sight direction of the user. For example, it is possible to set the focus area such that the subject in the line-of-sight direction has just focus according to the line-of-sight direction, and perform aperture adjustment control according to the brightness of the subject in the line-of-sight direction and the like.

The camera control unit 18 has a function as the arithmetic unit 40 by an application program.

The arithmetic unit 40 performs a process of acquiring registration information in which the motion determined from the shapes of the eyes and the periphery of the eyes and the process are associated with each other. In addition, the arithmetic unit 40 performs processing of acquiring an eye peripheral image from the eye sensor camera 42. In addition, the arithmetic unit 40 performs processing of selecting processing included in the registration information on the basis of the registration information and the eye peripheral image. In addition, the arithmetic unit 40 performs control such that the selected processing is executed.

Details of the processing of the arithmetic unit 40 will be described later.

Note that the camera control unit 18 may perform so-called artificial intelligence (AI) processing for the processing of the arithmetic unit 40 and other processing.

The RAM in the memory unit 19 is used for temporary storage of data, a program, and the like as a work area during various types of data processing of the CPU of the camera control unit 18.

The ROM and the flash memory (non-volatile memory) in the memory unit 19 are used for storing an operating system (OS) for the CPU to control each unit, content files such as image files, application programs for various motions, firmware, various kinds of setting information, and the like.

The various types of setting information include communication setting information, exposure setting as setting information regarding an imaging motion, shutter speed setting, mode setting, white balance setting as setting information regarding image processing, color setting, setting regarding an image effect, and the like.

The memory unit 19 also stores programs for processing using the eye peripheral image and various types of calibration processing. The memory unit 19 also stores data used for these processes. For example, the memory unit 19 can also function as a database for processing selection using the eye peripheral image and the registration information. For example, registration information described later is stored.

The driver unit 22 is provided with, for example, a motor driver for a zoom lens drive motor, a motor driver for a focus lens drive motor, a motor driver for an aperture mechanism motor, and the like.

In these motor drivers, a drive current is applied to the corresponding driver in response to an instruction from the camera control unit 18 to perform moving the focus lens and zoom lens, opening and closing aperture blades of the aperture mechanism, and the like.

The sensor unit 43 comprehensively indicates various sensors mounted on the imaging apparatus 1.

As the sensor unit 43, for example, an inertial measurement unit (IMU) may be mounted. With the IMU, angular velocity can be detected by an angular velocity (gyro) sensor of three axes of pitch, yaw, and roll, for example, and acceleration can be detected by an acceleration sensor. As a result, the posture or the like of the imaging apparatus 1 with respect to the gravity direction can be detected.

As the sensor unit 43, for example, a pressure sensor, a touch sensor, a position information sensor, an illuminance sensor, a distance measuring sensor, or the like may be mounted.

3. Configuration Example of Information Processing Apparatus

Next, a configuration example of the terminal apparatus 100 as the PC or the smartphone illustrated in FIG. 1 as an example of the information processing apparatus of the present disclosure will be described with reference to FIG. 4.

The CPU 71 of the terminal apparatus 100 executes various types of processing according to a program stored in the non-volatile memory unit 74 such as the ROM 72 or, for example, an electrically erasable programmable read-only memory (EEP-ROM) or a program loaded from the storage unit 79 to the RAM 73. The RAM 73 also stores, as appropriate, data and the like necessary for the CPU 71 to perform the various types of processing.

The CPU 71, the ROM 72, the RAM 73, and the non-volatile memory unit 74 are connected to one another via a bus 83. An input/output interface 75 is also connected to the bus 83.

Note that, since it is also assumed that the terminal apparatus 100 performs image processing and artificial intelligence (AI) processing, a graphics processing unit (GPU), a general-purpose computing on graphics processing units (GPGPU), an AI-dedicated processor, or the like may be provided instead of the CPU 71 or together with the CPU 71.

An input unit 76 including an operation element and an operation device is connected to the input/output interface 75. As the input unit 76, for example, one of various operation elements and operation devices including a keyboard, a mouse, a key, a dial, a touch panel, a touch pad, a remote controller, and the like is assumed.

A user operation is detected by the input unit 76, and a signal corresponding to an input operation is interpreted by the CPU 71.

A microphone is also assumed as the input unit 76. It is also possible to input voice uttered by the user as operation information.

Furthermore, various sensing devices such as an image sensor (imaging unit), an acceleration sensor, an angular velocity sensor, a vibration sensor, an atmospheric pressure sensor, a temperature sensor, and an illuminance sensor are also assumed as the input unit.

A display unit 77 including an LCD, an organic EL panel, or the like, and an audio output unit 78 including a speaker or the like are integrally or separately connected to the input/output interface 75.

The display unit 77 is a display unit that performs various displays, and includes, for example, a display device provided in a housing of the terminal apparatus 100, a separate display device connected to the terminal apparatus 100, or the like.

The display unit 77 executes display of an image for various types of image processing, a moving image to be processed and the like on a display screen on the basis of an instruction of the CPU 71. In addition, the display unit 77 displays various operation menus, icons, messages, and the like, that is, graphical user interfaces (GUIs), on the basis of an instruction from the CPU 71.

In some cases, a storage unit 79 including a hard disk, a solid-state memory, or the like, and a communication unit 80 including a modem or the like are connected to the input/output interface 75.

The storage unit 79 stores various programs, data files, and the like. A database may be constructed.

The communication unit 80 performs communication processing via a transmission path such as the Internet, and performs wired/wireless communication with various devices and communication based on bus communication or the like.

A drive 81 is also connected to the input/output interface 75 as necessary, and a removable recording medium 82 such as a magnetic disk, an optical disk, a magneto-optical disk, a semiconductor memory, or the like is appropriately mounted.

The drive 81 can read a data file such as an image file, various computer programs and the like from the removable recording medium 82. The read data file is stored in the storage unit 79, and an image and audio included in the data file are output by the display unit 77 and the audio output unit 78. Furthermore, the computer program and the like read from the removable recording medium 82 are installed in the storage unit 79, as necessary.

In the terminal apparatus 100, for example, software for the processing of the present embodiment can be installed via network communication by the communication unit 80 or the removable recording medium 82. Alternatively, the software may be stored in advance in the ROM 72, the storage unit 79, or the like.

The line-of-sight detection apparatus unit 41 may be connected to the input/output interface 75. As described in the configuration of the imaging apparatus 1 of FIG. 3, the line-of-sight detection apparatus unit 41 is a device for detecting the line of sight of the user, and includes, for example, an infrared LED that emits infrared rays to the user's eyes, an infrared camera that images the user's eyes, and the like.

The eye sensor camera 42 is connected to the input/output interface 75. As described with reference to FIG. 3, the eye sensor camera 42 also includes, for example, a visible-light image sensor and an imaging signal processing circuit, and captures an eye peripheral image. The captured eye peripheral image is used for processing by the CPU 71.

The sensor unit 43 may be connected to the input/output interface 75. As the sensor unit 23, various sensing devices are assumed, similarly to those described in the configuration of the imaging apparatus 1 of FIG. 3.

In the terminal apparatus 100, the CPU 71 has a function as the arithmetic unit 40 by the application program. The arithmetic unit 40 has a processing function similar to that of the arithmetic unit 40 described in the imaging apparatus 1 of FIG. 3.

The non-volatile memory unit 74, the ROM 72, and the storage unit 79 store information necessary for the processing of the arithmetic unit 40. For example, registration information and the like described later are stored.

4. Functional Configuration and Registration Information of Arithmetic Unit

The arithmetic unit 40 in the imaging apparatus 1 and the terminal apparatus 100 described above will be described.

Figure 5:
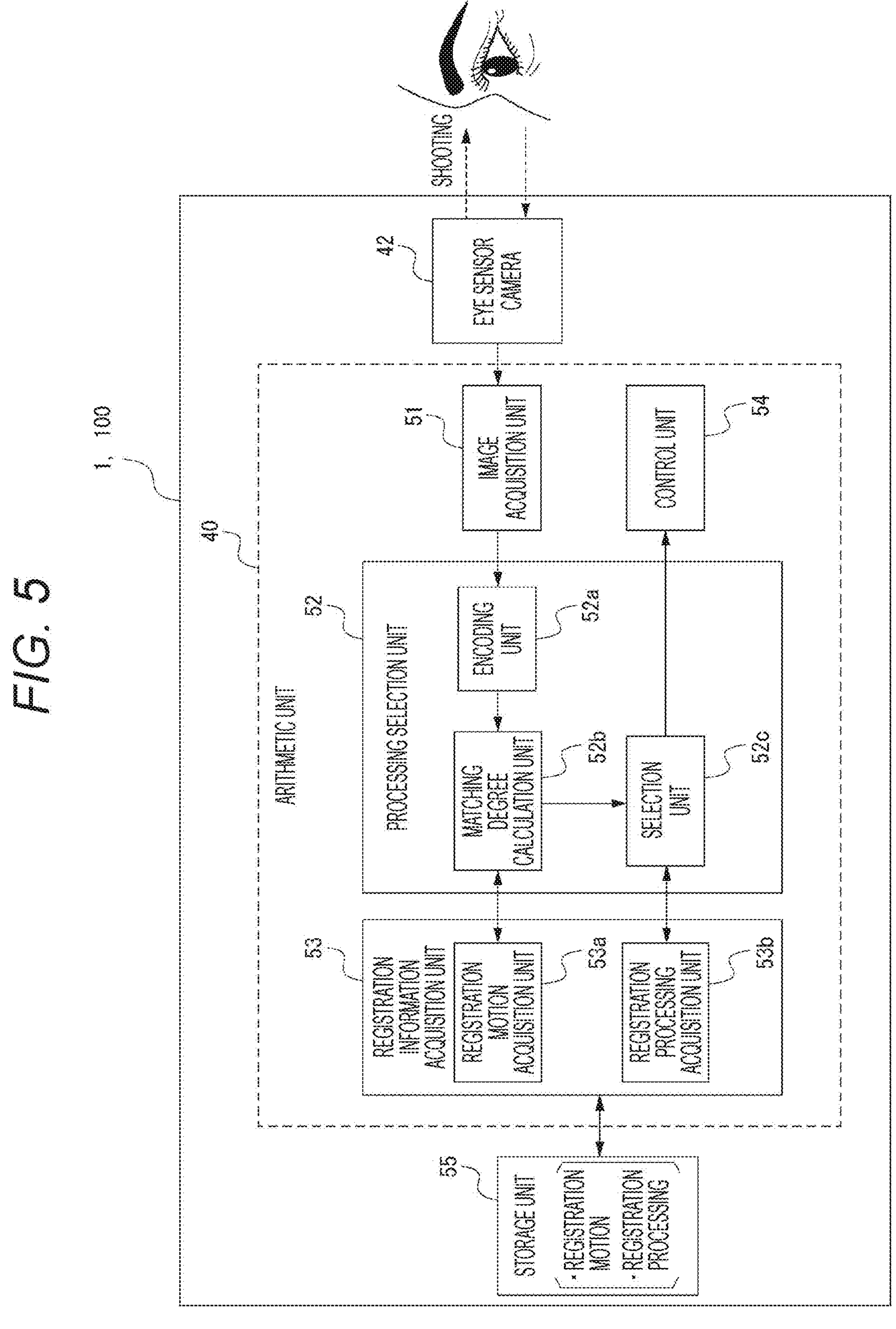
FIG. 5 is a block diagram of a functional configuration of an arithmetic unit according to the embodiment.

FIG. 5 illustrates a functional configuration of the arithmetic unit 40. The arithmetic unit 40 includes an image acquisition unit 51, a processing selection unit 52, a registration information acquisition unit 53, and a control unit 54 as a software functional configuration realized by the application program.

The image acquisition unit 51 is a function of acquiring an image captured by the eye sensor camera 42 as a processing target. The eye sensor camera 42 continuously performs an imaging motion at a predetermined frame rate, for example, and supplies image data of each frame as an eye peripheral image to the camera control unit 18 or the CPU 71. The image acquisition unit 51 sequentially takes in the image data of each frame (or intermittent frame) as a processing target.

The registration information acquisition unit 53 acquires, from the storage unit 55, registration information in which a motion determined from the eye and the shape around the eye is associated with processing.

Figure 4:
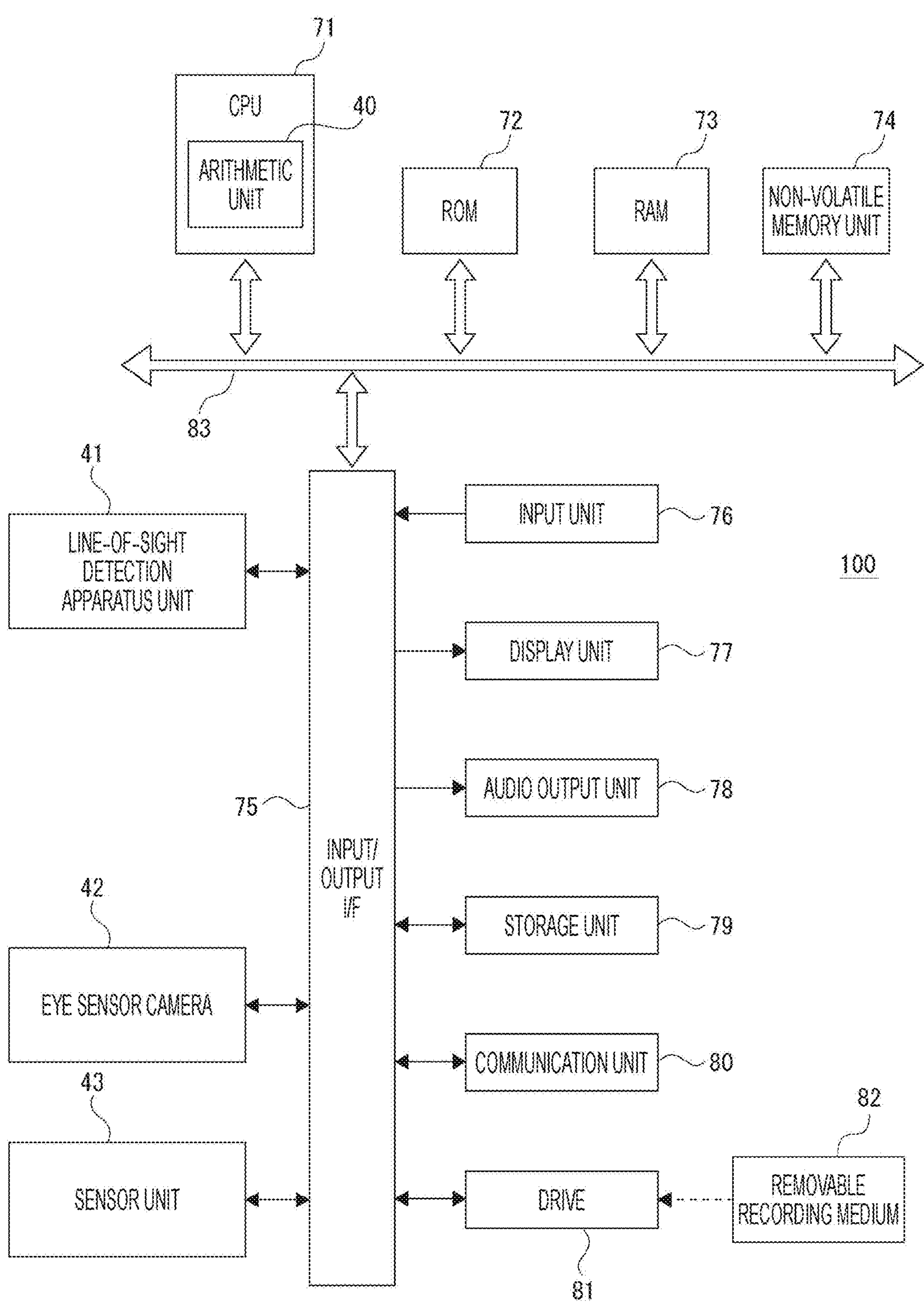
FIG. 4 is a block diagram of the information processing apparatus according to the embodiment.

The storage unit 55 is configured as, for example, a storage area of the memory unit 19 in the case of the imaging apparatus 1 of FIG. 3, and a storage area of the non-volatile memory unit 74 or the storage unit 79 in the case of the terminal apparatus 100 of FIG. 4. Then, the storage unit 55 stores the registration information.

An example of the registration information is illustrated in FIG. 6.

The registration information is information registered in advance by a user's registration operation or as preset registration by the manufacturer of the imaging apparatus 1 or the terminal apparatus 100 or the like.

The registration information stores "motion" and "processing" in association with each other.

The "motion" is a motion expressed by the eye and the shape around the eye. For the sake of description, such a motion expressed by the eyes and the shape around the eyes are also referred to as an "eye gesture". Then, a specific mode as the eye gesture is registered in the registration information. The motion registered in the registration information is referred to as a "registration motion" for the sake of description. For example, in the example of FIG. 6, "strongly closing eyes", "wink", "startle", "smile", and "frown" are set as the registration motion as the motion expressed by the eye gesture.

In the registration information, processing is associated with these registration motions. The associated processing is referred to as "registration processing" for the sake of description. In the example of FIG. 6, processing of various operations such as "shutter operation", "AF (autofocus) operation", "AE (auto exposure) operation", "peaking assist operation", and "zoom-in operation" is associated as the registration processing with each registration motion such as "strongly closing eyes". Note that peaking assist is a process of highlighting and presenting a focus position in a through image.

Furthermore, the registration information may be provided for each user as illustrated in FIG. 7. FIG. 7 illustrates an example in which registration information is stored for each individual user U1 and U2.

For example, the registration information regarding the user U1 is associated with registration motions such as "strongly closing eyes", "wink", "startle", "smile", and "frown", and registration processing such as "shutter operation", "AF operation", "AE operation", "peaking assist", and "zoom-in operation", together with the personal identification information of the user U1.

Meanwhile, for example, the registration information related to the user U2 is associated with registration motions such as "squinting eyes", "frown", "closing eyes", "applying force to eyes (staring)", and "opening eyes", and registration processing such as "determination operation", "shutter operation", "continuous shooting operation", "zoom-in operation", and "zoom-out operation", together with the personal identification information of the user U2.

For example, as in the examples of FIGS. 6 and 7, the registration motion and the registration processing are associated as the registration information.

Note that the storage unit 55 also stores data for performing motion determination of the registration motion for the eye peripheral image. For example, shape data corresponding to a motion, a data set of a deep neural network (DNN) learning model, pattern data used for object recognition by semantic segmentation, and the like are also stored.

Furthermore, the storage unit 55 may store calibration data corresponding to individual differences in shape around eyes and individual differences in motion for each user.

Furthermore, the storage unit 55 may store data for personal recognition in a case where registration information for each individual is used as illustrated in FIG. 7, for example, code information obtained by encoding an iris pattern, pattern data of an eye shape, and the like.

The registration information acquisition unit 53 in FIG. 5 acquires data related to the registration motion from the storage unit 55 as a function of the registration motion acquisition unit 53*a*.

In addition, the registration information acquisition unit 53 acquires data of the registration processing from the storage unit 55 as a function of the registration processing acquisition unit 53*b*.

The processing selection unit 52 is a function of selecting the registration processing included in the registration information on the basis of the registration information and the eye peripheral image.

In this example, the processing selection unit 52 performs processing as the encoding unit 52*a*, the matching degree calculation unit 52*b*, and the selection unit 52*c*.

The encoding unit 52*a* encodes the frame of the eye peripheral image acquired by the image acquisition unit 51. This is processing of performing calculation using the machine learning model for the eye peripheral image of one frame, detecting the "state" expressed by the user's eyes and the periphery of the eyes, and obtaining coded data indicating the state. The "state" is the state of the eye and the shape around the eye at the moment, or the state of emotion/motion estimated from the shape. Specific examples will be described later.

As an example of an algorithm for performing encoding, image processing such as class classification by a machine learning model, edge detection, and difference extraction from a previous image can be considered.

As a result, what kind of "state" is detected in units of frames.

The matching degree calculation unit 52*b* calculates a matching degree with each registration motion for the motion expressed by the face peripheral image. For example, continuous "state" information for a certain period of time is referred to as "motion" of the face peripheral image. That is, the matching degree calculation unit 52*b* sets the "state" obtained by the encoding unit 52*a* in the past predetermined frame period from the present to the "motion", and calculates the matching degree between the "motion" and each registration motion.

Note that the matching degree calculation unit 52*b* may calculate the matching degree between the moving image data itself as a plurality of frames and each registration motion without performing encoding for each frame as described above.

The selection unit 52*c* selects the registration processing on the basis of the matching degree calculated by the matching degree calculation unit 52*b*. For example, the registration motion having the highest matching degree is determined, and the registration processing associated with the registration motion is selected.

The processing selection unit 52 selects one registration processing by the processing of the encoding unit 52*a*, the matching degree calculation unit 52*b*, and the selection unit 52*c*, for example.

The control unit 54 performs control such that the registration processing selected by the processing selection unit 52 is executed in the imaging apparatus 1 or the terminal apparatus 100. For example, in a case where "shutter operation" is selected, the control unit 54 controls the motion of the imaging apparatus 1 or the terminal apparatus 100 such that shutter processing (still image capturing and recording processing) is executed.

Note that, in FIGS. 6 and 7, the process of executing the operation of the user has been exemplified as the registration processing, but the registration processing is not limited to the process corresponding to the operation. Although specific examples will be described later, various auxiliary processing include a notification to a user, a process related to a display screen, and a process suitable for a shooting situation. Since processing other than such an operation is set as the registration processing, the control unit 54 may perform control other than control according to the operation.

5. First Embodiment

A processing example of the first embodiment by the above-described arithmetic unit 40 will be described. The determination of the registration motion may be performed in units of face peripheral images as moving images of a plurality of frames, or the "state" may be identified for each image (one frame), and a combination thereof may be set as the "motion" to perform the matching determination with the registration motion. In the first embodiment, an example of identifying a "state" for each frame, which is processing with a relatively light load, will be described.

Figure 8:
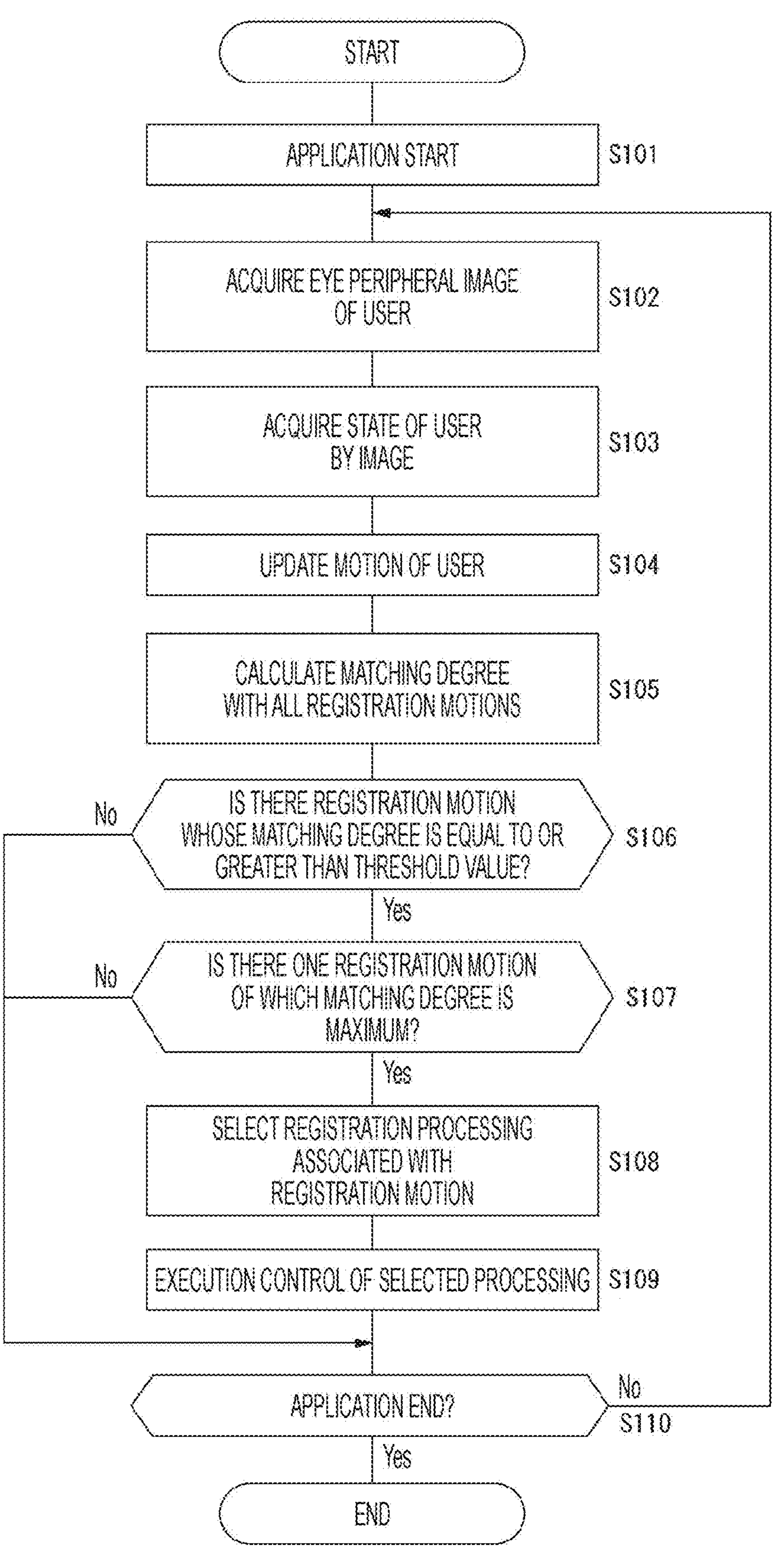
FIG. 8 is a flowchart of a processing example of the first embodiment.

FIG. 8 illustrates a processing example of the arithmetic unit 40.

In step S101, an application for executing the function of the arithmetic unit 40 is started. That is, an eye gesture is determined on the basis of the eye peripheral image obtained by the eye sensor camera 42, and processing based on an application program for selecting and executing corresponding processing is started. According to this application program, the processing of each function as the image acquisition unit 51, the processing selection unit 52, the registration information acquisition unit 53, and the control unit 54 illustrated in FIG. 5 is executed in the processor as the arithmetic unit 40.

Then, until it is determined in step S110 that the application is ended, the arithmetic unit 40 repeats the processing illustrated as steps S102 to S109.

In step S102, the arithmetic unit 40 acquires one frame of the user's eye peripheral image captured by the eye sensor camera 42.

Note that the acquired captured image of one frame may not be an eye peripheral image. For example, in the case of the imaging apparatus 1, the eye peripheral image is obtained when the user looks into the EVF 5, but the eye peripheral image is not obtained when the user does not look into the EVF 5.

Although not illustrated in the flowchart, in a case where the acquired one frame is an image in which eyes are not reflected, the arithmetic unit 40 proceeds to the acquisition of the next frame without performing the processing in and after step S103.

In step S103, the arithmetic unit 40 acquires the "state" of the user by the above-described processing of the encoding unit 52*a* for the acquired eye peripheral image. That is, as described above, the "state" expressed by the user's eyes and the shapes around the eyes is detected by a method such as class classification using a machine learning model.

FIG. 9 illustrates a specific example of the "state" that can be determined from the eye peripheral image.

From the eye peripheral image of one frame, it is possible to determine the shape of an individual's eye and the distinction between the left eye and the right eye. That is, shape information for personal identification of the user, information indicating the left eye and the right eye, and the like are examples of the "state" information.

In addition, from the eye peripheral image of one frame, it is possible to determine, as the degree of opening of the eyes at that time, a state of being opened, a normal state, a state of being closed, a state of being strongly closed, and the like. These are also examples of the "state" information.

Furthermore, the position, orientation, and rotation state of the eye can be determined from the eye peripheral image of one frame. For example, the information is the position of the eye of the user looking into the EVF 5, that is, the information of the relative position and direction of the eye with respect to the EVF 5. Such information includes a normal position, a state of rotation shifted in the X direction (horizontal direction) or the Y direction (vertical direction), a state shifted in the Z direction (distal-proximal direction with respect to the EVF 5), and the like. In addition, there are a state when the user looks into the EVF 5 from above as indicated by "downward", a state when the user looks into the EVF 5 from below as indicated by "upward", a state when the user looks into the EVF 5 from the left and right direction as indicated by "sideways", and the like. Furthermore, depending on the posture of the imaging apparatus 1, that is, whether the user holds the imaging apparatus 1 vertically or horizontally, the vertical and horizontal directions change, and there is also a state like "vertically holding" in the figure. These are also examples of the "state" information.

Furthermore, although not illustrated, the "state" includes information such as the shape of wrinkles around the eyes and the shape, position, and angle of eyebrows, and these are also examples of the "state" information.

In step S104 of FIG. 8, the arithmetic unit 40 updates the "motion" of the user. For example, information of a certain continuous "state" such as "state" in the current frame to the past N frames is set as "motion" at the present time.

That is, a "state" is newly added for each frame, a "state" before a certain period of time or more is deleted, and a plurality of "states" for the certain period of time is set as "motions".

Note that, in a case where a result clearly different from the determination results of the preceding and subsequent "states" is detected, it is desirable to perform processing such as correction as an outlier.

Since the motion is grasped as continuation of the "state" as illustrated in FIG. 9, there is a motion expressed by a change in the "state" or a motion expressed by continuation of the "state".

For example, as the "motion" by continuation of the "state", there are motions of the same type as the "state", such as "opening eyes" and "strongly closing eyes". For example, when all the states for a certain period are "opening eyes", the "motion" is also determined as "opening eyes".

Examples of the "motion" expressed by the change of the "state" include "continuous wink", "wink at regular intervals", "head movement", and "facial expression".

The "continuous wink", the "wink at regular intervals", and the like are determined by detecting the "state" of "opening eyes" and "closing eyes" in a certain period.

Examples of the "head movement" include "horizontal movement", "approach", "retreat", "rotation", and the like, and these can be determined by a change in a position, a direction, or rotation as the "state" in a certain period.

In addition, there is an "facial expression" as the "motion" that can be determined by either continuation or change of the "state". Examples of the facial expression include "startle", "smile", "frown", "staring", and "contempt", and these can be determined by continuation or change in a certain period of time such as the degree of opening or wrinkle of the eye, the shape or angle of the eyebrow as the "state".

The arithmetic unit 40 determines the "motion" as in the above example from the "state" of each of the plurality of frames of the face peripheral image.

In step S105, the arithmetic unit 40 calculates the matching degree for all the registration motions for the updated "motion".

Note that all the registration motions are all the stored registration motions in a case where individual registration is not performed as illustrated in FIG. 6. As illustrated in FIG. 7, in a case where the registration information is prepared for each individual, the personal identification of the user is performed from the eye peripheral image, and all the registration motions registered for the individual are performed.

In addition, the matching degree calculation with all the registration motions is an example, and the matching degree calculation may be performed with respect to the registration motion of some candidates estimated from a certain "motion", that is, a "state" in a certain period, by determining the registration motion of the candidates.

When calculating the matching degree between the "motion" determined from the eye peripheral image and, for example, all the registration motions, the arithmetic unit 40 selects the registration motion of which the matching degree is equal to or greater than the threshold value and the matching degree is the highest. Therefore, in step S106, the arithmetic unit 40 first checks whether or not there is a registration motion whose matching degree is equal to or greater than the threshold value.

If not, it is determined that the motion (eye gesture) corresponding to the registration motion has not been performed at the present time, and the process returns to step S102 via step S110. That is, in this case, the processing control by the eye gesture is not activated.

In a case where there is a registration motion of which the matching degree is equal to or greater than the threshold value, the arithmetic unit 40 checks whether or not there is one registration motion of which the matching degree is the maximum in step S107.

In a case where the plurality of registration motions has the maximum matching degree, it is determined that the motion has not been clearly determined, and the arithmetic unit 40 returns to step S102 via step S110. Also in this case, the processing control by the eye gesture is not activated.

In a case where there is one registration motion with the maximum matching degree, the arithmetic unit 40 proceeds to step S108 and selects registration processing associated with the registration motion.

Then, in step S109, the arithmetic unit 40 performs control such that the selected registration processing is executed. For example, in a case where the selected processing is a shutter operation process, the arithmetic unit 40 performs control such that processing of still image capturing and recording according to the shutter operation is executed.

By repeating the processing of FIG. 8 until it is determined in step S110 that the application is ended, the user performs an eye gesture at an arbitrary time point during activation of the application, and operation processing or the like corresponding thereto is executed.

Note that, in step S108, the arithmetic unit 40 may display the determination result of the motion and the selection result of the processing on the screen with an icon or a character to notify the user. The notification may be made by sound effect or sound. Furthermore, in a case where the user shakes his/her head or the like in response to such a notification, the selection may be canceled. For example, when a process that does not meet the user's intention is about to be executed, the process in step S110 can be canceled without being executed.

An example of selection of processing according to the matching degree calculation in the above processing of FIG. 8 will be described.

For example, consider a case where the calculation result of the matching degree is as illustrated in FIG. 10. The example of FIG. 10 illustrates the matching degree calculated for each registration motion in a case where the registration motion of "strongly closing eyes", "wink", "startle", "smile", and "frown" exists as the registration information.

In step S106, the arithmetic unit 40 compares the matching degree with a threshold value.

Note that, in the example of FIG. 10, the threshold value is different for each registration motion. This is to adjust the ease of activation as the registration processing associated with the registration motion. For example, a registration motion corresponding to registration processing that does not particularly cause a problem even if it is erroneously activated, such as a shutter operation, is easily activated by lowering a threshold value. Meanwhile, in a case where the registration processing such as the image deletion operation is performed, the threshold value of the registration motion associated with the registration processing is set high, and the eye gesture is carefully determined.

Of course, this is an example, and the threshold value may be the same for all the registration motions.

In the example of FIG. 10, the matching degree of "startle" exceeds the threshold value. Therefore, the arithmetic unit 40 proceeds to step S107. Furthermore, in this case, the registration motion with the maximum matching degree is only "startle". Therefore, the arithmetic unit 40 proceeds to steps S108 and S109, and performs control so as to perform the registration processing corresponding to "startle", for example, processing corresponding to the AE operation according to the example of the registration information of FIG. 6.

The example of FIG. 11 is a case where a plurality of registration motions such as "strongly closing eyes" and "frown" exists as the registration motion in which the matching degree exceeds the threshold value, and the matching degree is the same as the maximum value. In such a case, the arithmetic unit 40 returns from step S107 to step S102 and does not activate the process.

The example of FIG. 12 is a case where there is "smile" as the registration motion with the maximum matching degree, but there is no registration motion with the matching degree exceeding the threshold value. In such a case, the arithmetic unit 40 returns from step S106 to step S102 and does not activate the process.

Note that the above processing is an example. For example, when there is a registration motion with the maximum matching degree as illustrated in FIG. 12 without providing the determination of the threshold value in step S106, the control of the registration processing associated with the registration motion may be executed.

In addition, in a case where there is a plurality of registration motions in which the matching degree becomes the maximum value as illustrated in FIG. 11, any one of the registration motions may be selected, and execution control of corresponding processing may be performed. For example, it is conceivable that processing is prioritized and one of the processing is selected in light of the priority.

6. Second Embodiment

As illustrated in FIGS. 11 and 12, the second embodiment is an example of notifying the user in a case where there is no registration motion in which the matching degree is equal to or greater than the threshold value or in a case where there is a plurality of registration motions in which the matching degree is the maximum value.

Figure 13:
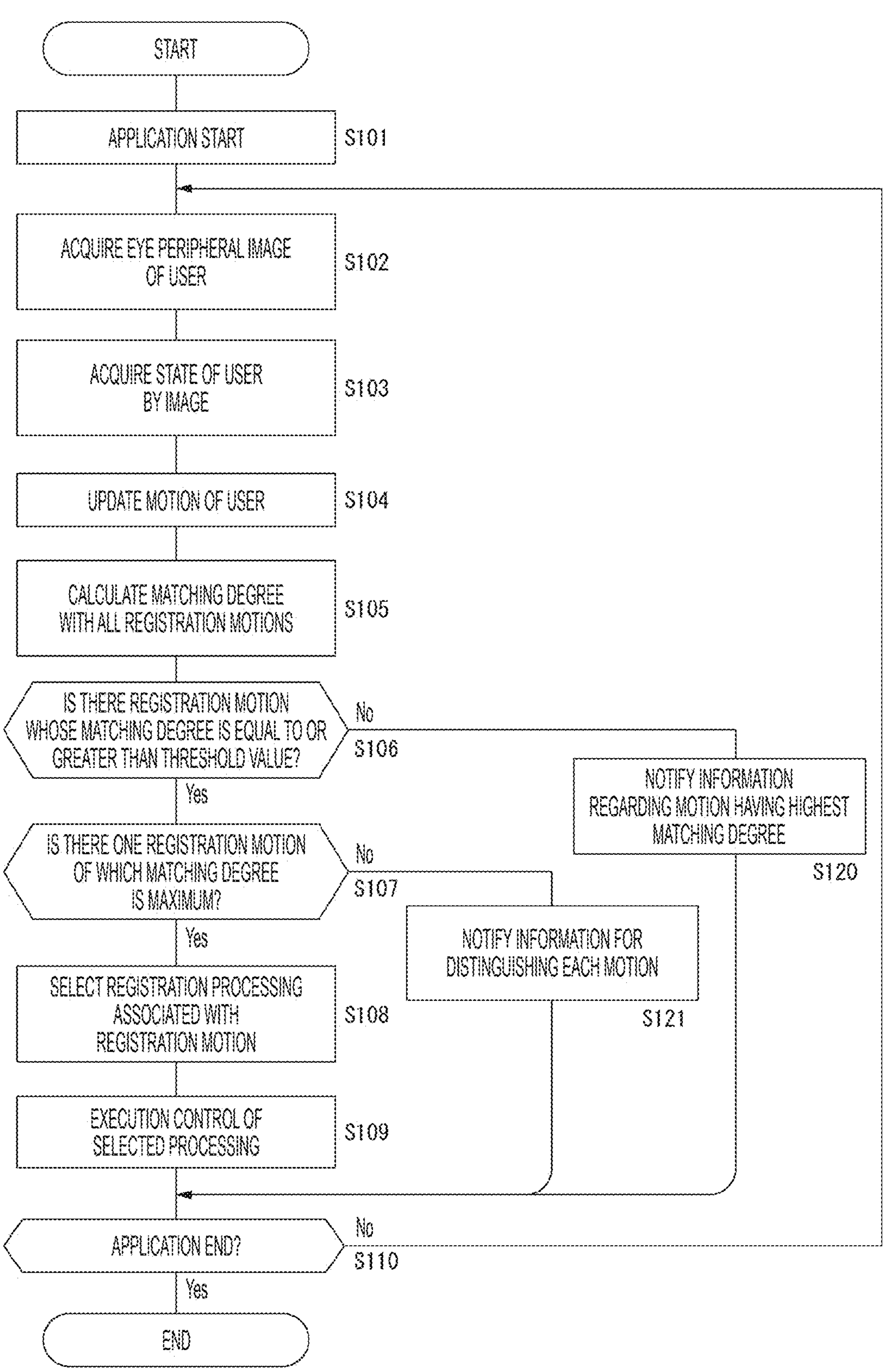
FIG. 13 is a flowchart of a processing example of the second embodiment.

FIG. 13 illustrates a processing example of the arithmetic unit 40. Note that, in the flowcharts of the respective embodiments described below, the same processes as the above-described processes are denoted by the same step numbers, and redundant description is avoided.

In the processing example of FIG. 13, in a case where it is determined in step S106 that there is no registration motion whose matching degree is equal to or greater than the threshold value, the arithmetic unit 40 proceeds to step S120 and performs processing of notifying information regarding a motion having the highest matching degree.

For example, in the case of FIG. 12, the matching degree of "smile" is the highest, but the certainty of the eye gesture is low since the matching degree is lower than the threshold value. Therefore, the arithmetic unit 40 causes the display unit 15 of the EVF 5 or the like to execute message display such as "Please squint your eyes and smile", and notifies the user to have a clearer smile. As a result, it can be expected that the user performs a clearer eye gesture in response to the notification.

In addition, in a case where it is determined in step S107 that there is a plurality of registration motions having the maximum matching degree, the arithmetic unit 40 proceeds to step S121 and performs control to display information for distinguishing each motion.

For example, as illustrated in FIG. 11, in a case where the matching degree becomes the maximum value for both of "strongly closing eyes" and "frown", it is conceivable to control a notification such as "Please extend closing time or move eyebrow a little more." to be indicated by characters or icons.

This also makes it possible to expect the user to make a clearer eye gesture.

7. Third Embodiment

Figure 14:
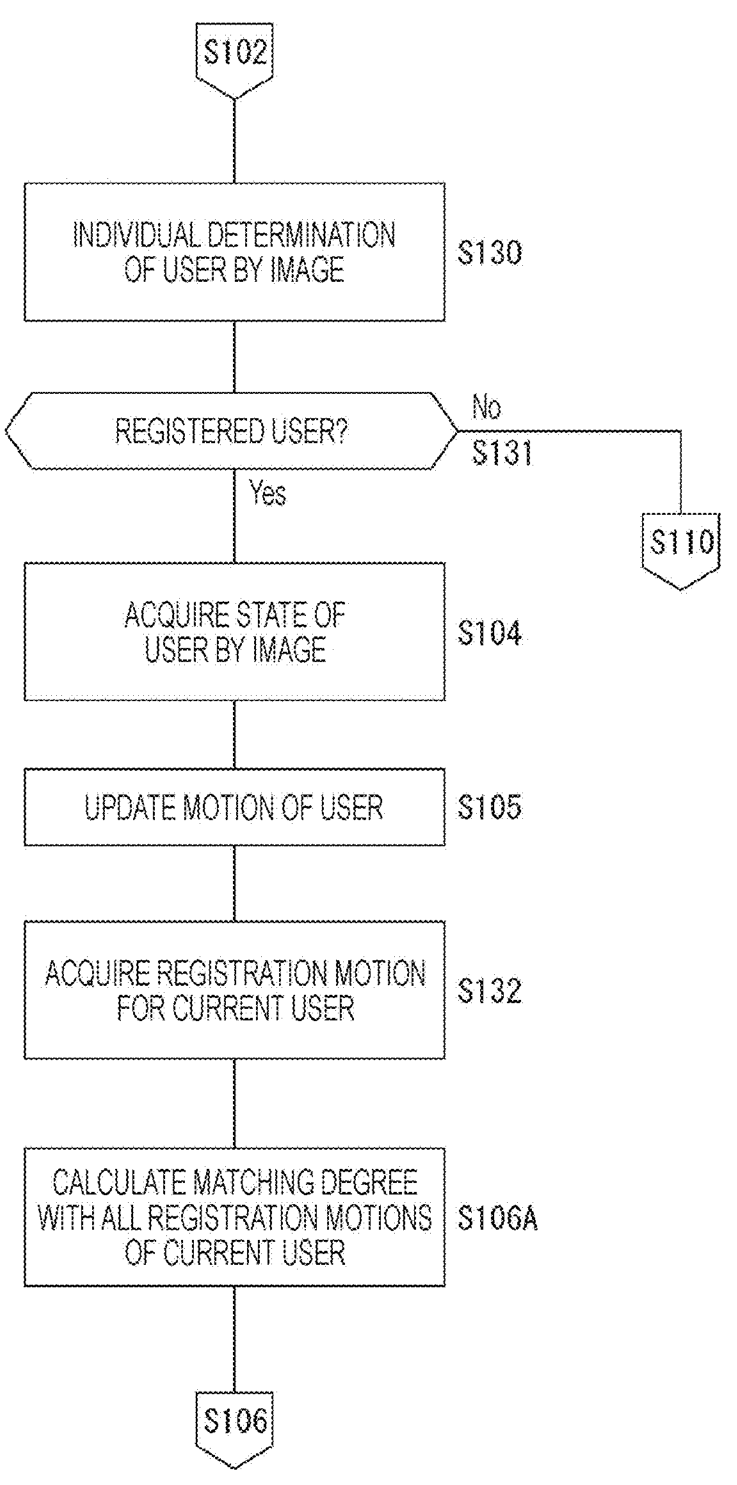
FIG. 14 is a flowchart of a processing example of the third embodiment.

A processing example of the third embodiment is illustrated in FIG. 14. FIG. 14 is a modification of the above-described processing between step S102 and step S106 in FIG. 6 or 13.

It is assumed that the registration information is registered corresponding to each individual as illustrated in FIG. 7.

After acquiring the frame of the eye peripheral image in step S102, the arithmetic unit 40 determines whether or not the user is a registered user based on the eye peripheral image in step S130 of FIG. 14. For example, the shape of the eye in the eye peripheral image is compared with the shape of the registered user's eye. Whether or not the user is a registered user may be determined by iris authentication.

If it is determined that the image is not the registered eye peripheral image of the user, the arithmetic unit 40 returns from step S131 to step S102 via step S110.

That is, if the user is not a registered user, the processing according to the determination of the eye gesture is not activated.

Meanwhile, when determining that the user is the registered user, the arithmetic unit 40 determines the "state" and updates the "motion" in steps S104 and S105, and acquires the registration information corresponding to the user individual determined this time in step S132. Then, in step S106A, the matching degree between each registration motion included in the registration information of the user and the "motion" determined in step S105 is calculated. Then, the arithmetic unit 40 performs the processing described with reference to FIG. 6 or 13 after step S106.

With such a processing example of FIG. 14, the processing by the eye gesture can be activated only for the registered user.

8. Fourth Embodiment

Figure 15:
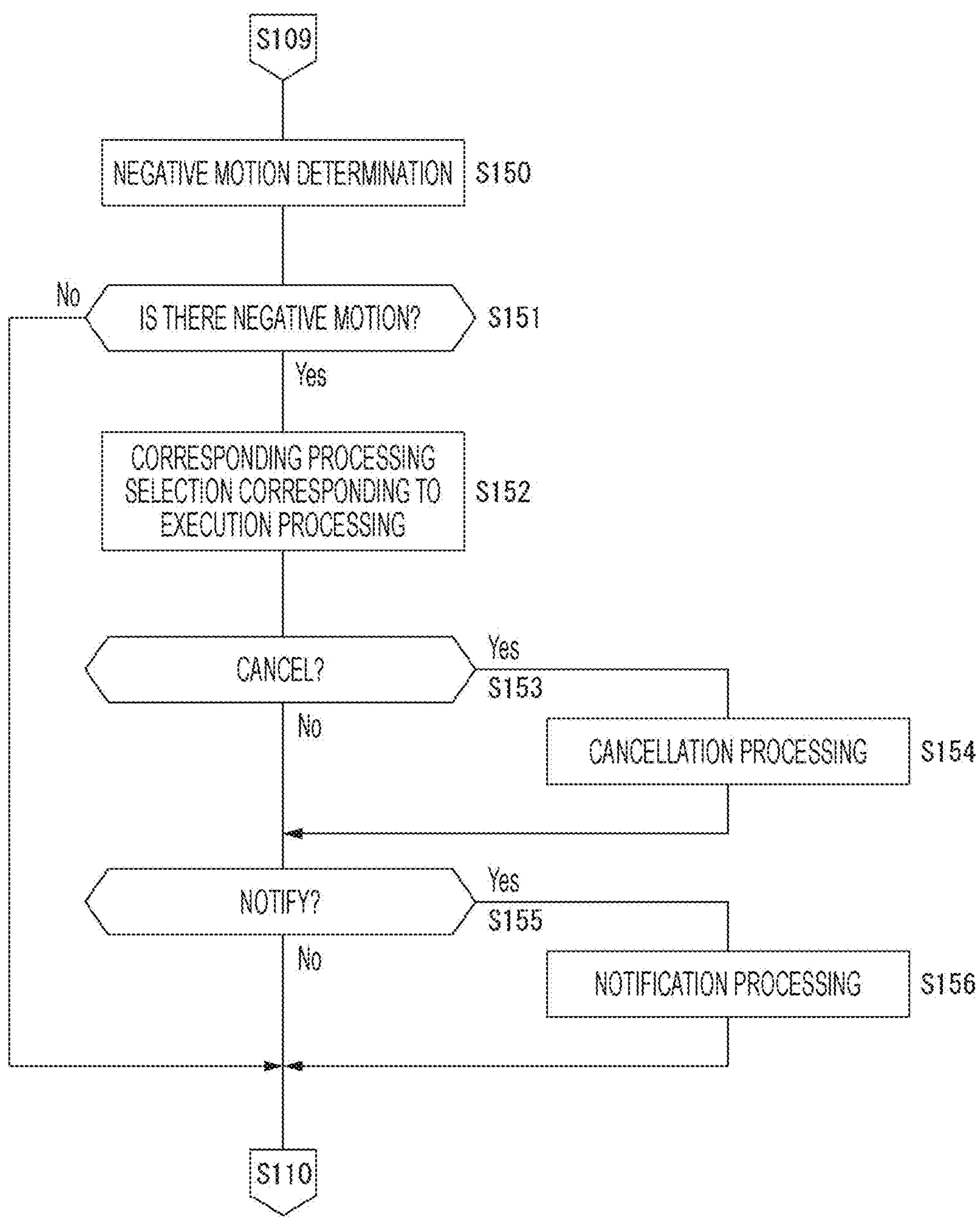
FIG. 15 is a flowchart of a processing example of the fourth embodiment.

A processing example of the fourth embodiment is illustrated in FIG. 15. FIG. 15 illustrates an example in which the above-described processing between step S109 and step S110 in FIG. 6 or 13 is added.

In a case where the control of the process selected in step S109 is executed, the arithmetic unit 40 determines a negative motion of the user in step S150.

For example, in a predetermined time (for example, about 2 seconds) immediately after processing such as a shutter operation is performed, it is determined whether or not there is a motion that can be estimated to be negative for the processing motion, such as frowning or being surprised, from the user's face peripheral image. In a case where the user shakes the head to the left and right, the shaking may be regarded as a negative motion.

In particular, when a negative motion is not detected, the arithmetic unit 40 returns to step S102 via step S110. Meanwhile, when a negative motion is detected, the arithmetic unit 40 proceeds to step S152 and selects corresponding processing corresponding to the execution processing.

The case where the user exhibits a negative motion is estimated to be a case where the processing executed in response to the eye gesture does not meet the user's intention. Therefore, corresponding processing for recovering the executed process is performed. However, it is assumed that the appropriate corresponding processing differs depending on the type of the executed process, and the corresponding processing is selected for each process.

For example, in a case where the still image capturing and recording processing is executed in response to a shutter operation, it is considered that there is no large damage to the user, and thus only notification is performed. Meanwhile, in a case where the image deletion processing is executed, since it is a relatively serious malfunction, the deletion is canceled (the deleted image is restored) and a notification or the like is made. In a case where the AF processing or the like is executed, only cancellation (cancellation of AF) may be required.

In a case where it is determined to execute the cancellation of the processing by the corresponding processing selection in step S152, the arithmetic unit 40 proceeds from step S153 to step S154 and performs the cancellation processing. Note that, regarding the cancellation processing in step S154, an inquiry notification as to whether or not to cancel may be made, and the cancellation processing may be executed in a case where the user performs an operation (including an eye gesture) that allows cancellation.

In addition, in a case where the notification of the message or the like is executed by the selection of the corresponding processing in step S152, the arithmetic unit 40 proceeds from step S155 to step S156 and performs necessary notification processing to the user. For example, a notification indicating that the shutter processing has been performed by the processing by the eye gesture is given.

With such a processing example of FIG. 15, recovery can be performed in a case where it is estimated that activation of the processing by the eye gesture is not appropriate for the user.

9. Fifth Embodiment

Figure 16:
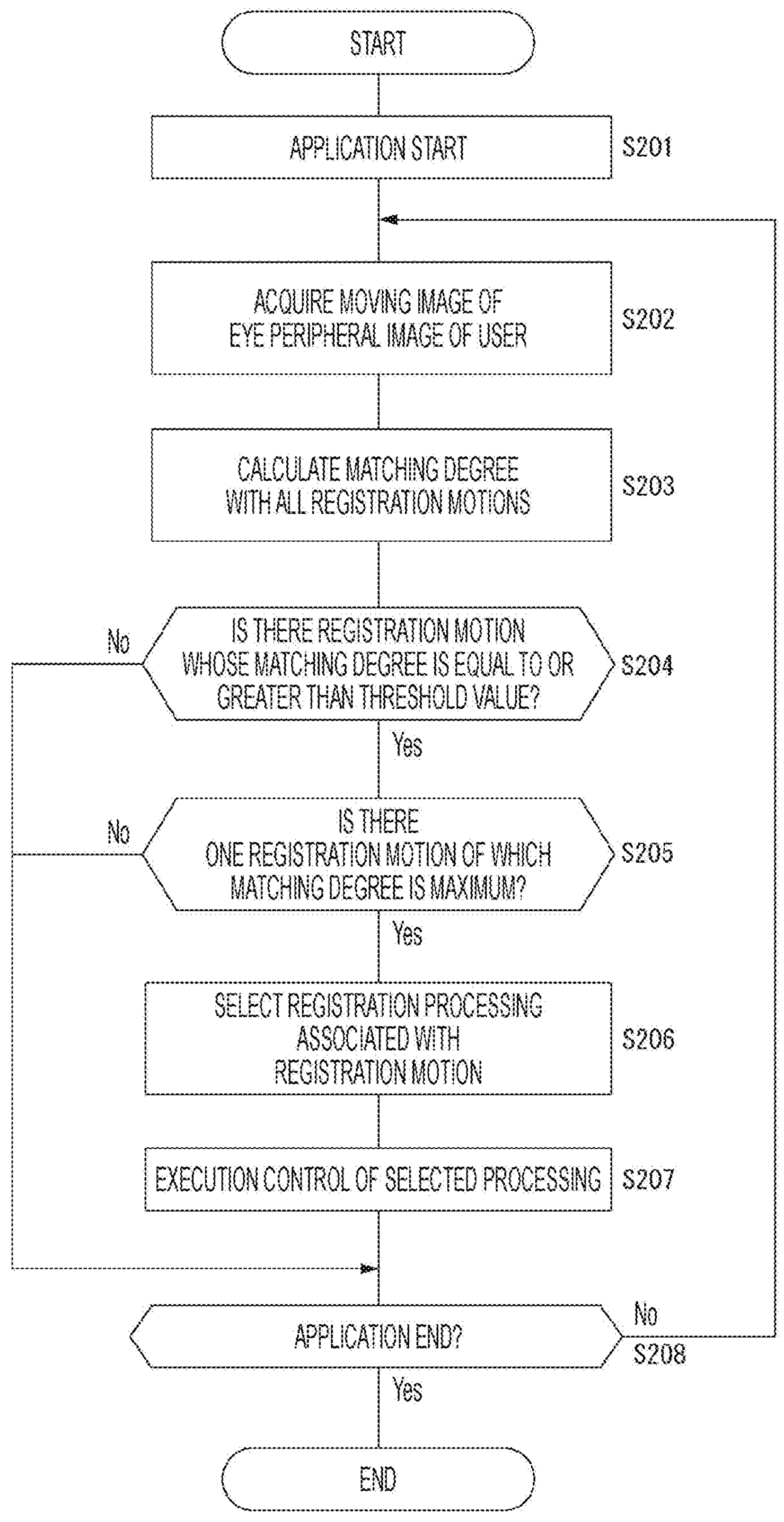
FIG. 16 is a flowchart of a processing example of the fifth embodiment.

As a fifth embodiment, an example in which the matching degree calculation is performed by moving images of a plurality of frames is illustrated in FIG. 16.

After starting the application in step S201, the arithmetic unit 40 repeats the processing from step S202 to step S207 until the application ends in step S208.

In step S202, the arithmetic unit 40 acquires a moving image as an eye peripheral image. In this case, a plurality of frames obtained by capturing a motion in a certain period is set as a processing target.

Then, in step S203, the arithmetic unit 40 performs DNN processing or the like on the moving image of a plurality of frames, and calculates the matching degree with the registration motion.

Steps S204 to S207 are similar to the processing of steps S106 to S109 in FIG. 8.

As described above, a processing example of determining the matching degree with the registration motion in units of a plurality of frames is also assumed. However, in that case, there is a circumstance that the processing load becomes larger than the processing of determining the "state" for each frame as illustrated in FIG. 8, and thus, it is desirable to apply the present technology to an apparatus having sufficient processing capability.

10. Motion and Processing in Each Embodiment

Hereinafter, motions and processing applicable to the processing examples of the first to fifth embodiments described so far will be described.

As described above, various types of processing according to the eye gesture can be realized in the imaging apparatus 1 or the terminal apparatus 100 by including the registration information, acquiring the eye peripheral image, determining the motion, and selecting the processing. For example, the processing is as follows.

- When the eyes are strongly closed, still image capturing and recording processing is performed as a shutter operation.
- When the eyes are wide open, AF or AE is performed.
- When a force is applied to the eye (staring), a zoom motion or a peaking assist is performed.
- When the user smiles or is surprised, still image capturing and recording processing is performed as a shutter operation.
- When a wrinkle is generated between the eyebrows at the time of the image preview immediately after the still image capturing and recording, the preview screen is immediately ended.
- When it is determined that the user has a smiling face at the time of viewing the image preview, the image is tagged or protected.
- In a case where the user closes his/her eyes at the time of notification of the setting value change, a notification is provided to the user again after the eyes are opened.
- When the value is changed by the dial operation, in a case where the wrinkle is generated between the eyebrows while looking at the result, it is determined that the value is excessively changed, and the value is returned.
- When the user squints due to the glare, the exposure is lowered or the luminance of the EVF 5 is lowered.

The above is specific processing examples corresponding to the motions as the eye gesture.

Such combinations of the motions and the processing are set in advance by the user or the manufacturer, and are registered as registration information.

Hereinafter, these exemplified operations and processes will be described.

Examples of the combination of operation and processing include motion and processing of an operation system and processing of an operation auxiliary system. First, an example of motion and processing of the operation system will be described.

For the motion of strongly closing the eyes, for example, processing as a shutter operation or a determination operation can be considered. The continuous shooting operation may be performed according to the closing time.

It is conceivable to associate the AF processing and the AE processing with the motion of opening the eyes wide. There is an example in which the AF processing and the AE processing are executed with respect to the position of the cursor (mouse cursor) in the through image displayed on the EVF 5.

In addition, in a case where the line-of-sight detection apparatus unit 41 is provided and the line-of-sight detection is possible, the AF processing and the AE processing may be performed on a subject ahead of the line of sight on the display of the EVF 5 or the like as a target.

For example, it is conceivable to associate zoom processing or peaking assist processing with the motion of squinting and staring. There is an example in which the processing is performed with respect to the position of the cursor (mouse cursor) in the display image of the EVF 5. Furthermore, in a case where the line-of-sight detection apparatus unit 41 is provided and the line-of-sight detection is possible, the peaking assist processing may be performed on a subject ahead of the line of sight on the display of the EVF 5 or the like as a target.

Furthermore, as the motion of the operation system, for example, a complex motion by an eye gesture may be used as the registration motion.

For example, a motion of "squinting eyes" and a motion of "head movement" are combined.

Figure 17C:
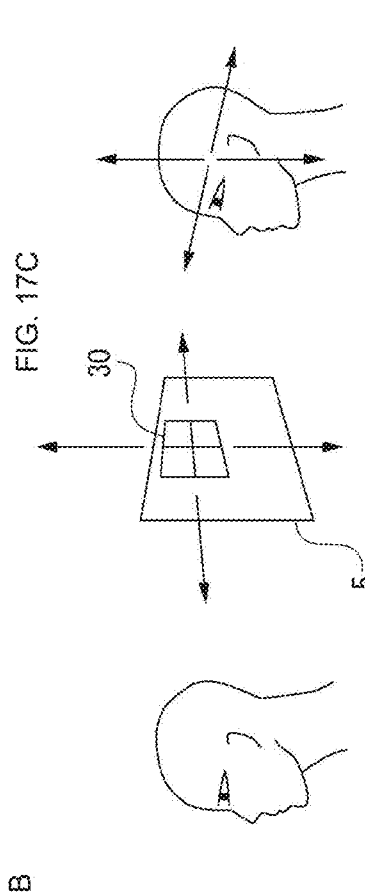
FIGS. 17A, 17B, 17C, 17D, and 17E are explanatory diagrams of an operation example in the embodiment.
Figure 17B:
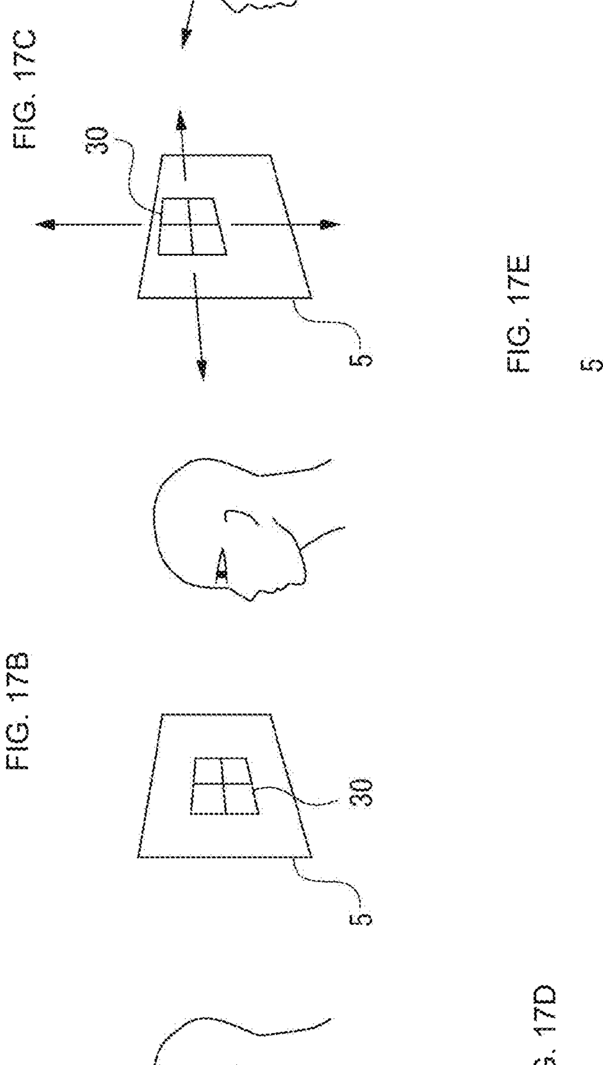
Figure 17A:
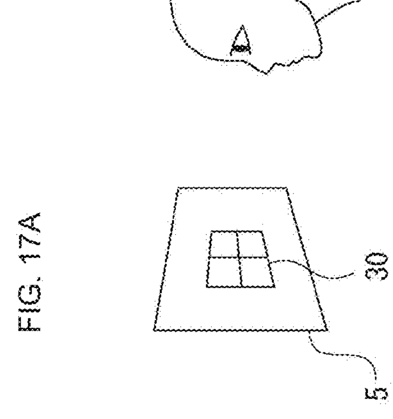

FIG. 17A illustrates a state in which a preview image 30 is viewed in the EVF 5. In such a display state of the preview image 30, when the user moves the head up, down, left, and right as illustrated in FIG. 17C while squinting the eyes as illustrated in FIG. 17B, the arithmetic unit 40 recognizes the drag operation of the preview image 30 and moves the image.

Figure 17E:
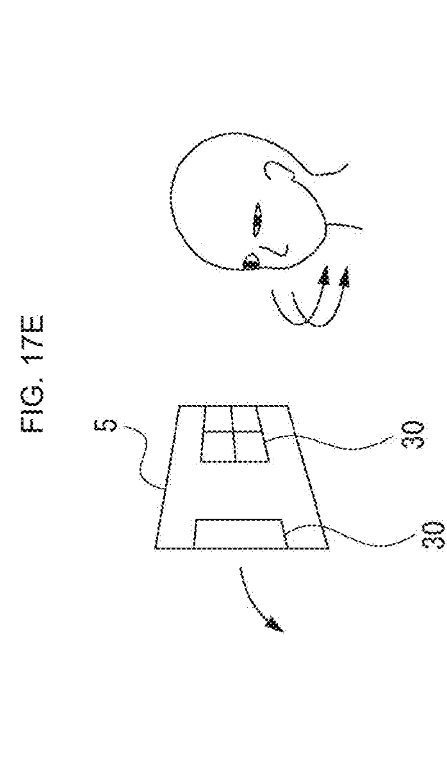
Figure 17D:
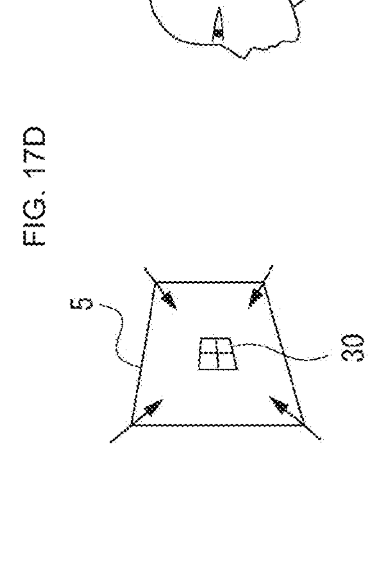

Furthermore, as illustrated in FIG. 17D, the arithmetic unit 40 may recognize the enlargement/reduction operation of the preview image 30 and perform the enlargement/reduction control of the image according to the user's movement of the head back and forth while squinting the eyes.

Furthermore, as illustrated in FIG. 17E, the arithmetic unit 40 may recognize the operation of skipping the preview image 30 to the next image and perform the image feed control on the display according to the user's squinting the eyes and shaking the head to the left and right.

Next, processing of the operation auxiliary system will be exemplified. For example, the arithmetic unit 40 performs corresponding processing to a situation estimated from the motion determined as the eye gesture.

Processing of calling data stored in each of the imaging apparatuses 1 is conceivable according to personal identification, distinction between right and left eyes, horizontal holding/vertical holding of the imaging apparatus 1, and the like.

For example, in a case where the registration information is stored according to the individual as described above, the registration information is selected and called according to the personal identification.

In addition, since the shapes of the eyes and the periphery of the eyes are different for each individual and for the right and left of the eyes, it is assumed that calibration is performed to some extent. In a case where such calibration data is stored, the calibration data is called according to the personal recognition or the recognition of the right and left of the eye.

It is also appropriate to select registration information or calibration data depending on whether the apparatus is held horizontally or vertically.

Auxiliary processing can also be performed depending on the head position.

For example, a looking-in position of the head is detected, and a GUI displayed on the EVF 5 or the like, a live view image, or a reproduced image of a recorded image is caused to follow the position of the head.

In addition, in the case of including the line-of-sight detection apparatus unit 41, the position of the infrared LED to be lit may be changed depending on the head position in order to improve the detection accuracy.

Auxiliary processing can also be performed by detection of eye closure.

For example, in a case where it is detected that the user has closed his/her eyes at a timing when some setting value change is performed and a notification of the change is provided to the user, a notification is provided to the user again after the eyes are opened.

In response to squinting the eyes, auxiliary processing can be performed as a glaring situation. For example, in a case where the user squints his/her eyes, the exposure is lowered or the luminance of the EVF 5 is lowered.

There is also an example in which auxiliary processing is performed by determining an emotion such as a smile.

For example, in a case where the user smiles or indicates surprise at the time of previewing a captured image, processing such as attaching a favorite tag to the image or performing protection setting is performed.

In a case where a motion of a negative emotion such as wrinkling between eyebrows is detected, there is the following processing example.

For example, in response to a notification (pop-up or the like) on the system side, when a motion of a negative emotion is detected, such a notification is immediately terminated.

Alternatively, setting change processing of not performing notification is performed thereafter.

In addition, when a negative emotional motion is detected at the time of previewing an image, the preview of the image is immediately ended.

In addition, when a negative emotional motion is detected in the process of inputting various values, dial operation, and the like, the value setting is returned to the original setting.

In addition, in a case where the user performs a motion indicating "difficulty in seeing", such as squinting, it is determined that the display is small and difficult to see, and processing of enlarging the display or simplifying the display for easy viewing is performed.

An age and an appropriate size may be set at the time of calibration according to the motion indicating "difficulty in seeing".

The relationship between the motion and the processing as exemplified above is stored in advance as registration information.

An example of a procedure of registering a motion and processing will be described.

First, the user selects processing that can be executed on the device as the imaging apparatus 1 or the terminal apparatus 100.

Note that, even in the same motion, different processing may be set for each target (subject, shooting mode, preview time, or the like).

Subsequently, the user performs a motion (eye gesture) associated with the processing. It is appropriate to perform the eye gesture a plurality of times and perform calibration and learning processing on the system side.

In this case, information indicating the shape of the eye or the periphery of the eye observed from the eye peripheral image or a change in the shape is set as the registration motion.

In addition, the user sets a matching degree threshold value (see S106) for the registration motion.

Here, in a case where the eye gesture is executed as the input of the registration motion, it is desirable to first register the straight face of the user.

Then, the user makes an eye gesture according to an emotion (laughter, surprise, anger, or the like) presented by the system. This is performed a plurality of times, and calibration and learning are performed on the system side. As a result, it is possible to register motion information suitable for an individual.

When the individual user performs the registration as described above, the registration motion suitable for the eye gesture of the user is stored, and the registration processing desired by the user is associated.

Note that, even if the user does not perform the registration by himself/herself, the device may store registration information by a combination of the registration motion and the registration processing as preset data.

It is desirable to register the eye and the motion around the eye (eye gesture) on the device actually used.

In addition, the registered contents may be stored on a cloud so that the registered contents can be called by another device.

The registration motion may be settable by a combination of a plurality of motions. A combination of a plurality of motions is suitable for preventing malfunction. For example, it is assumed that shutter operation is performed when eyes are opened and then strongly closed.

The eye gesture may be combined with another operation (button input or voice input). For example, by uttering "shutter" and closing the eyes, a shutter operation is performed.

Regarding the registration motion, it is desirable to improve the accuracy by saving the setting for each user or repeatedly performing calibration.

The accuracy may be updated by performing calibration in the background every time the operation being used succeeds.

In a case where an unregistered user uses the device, the function of this example may be activated by utilizing registration information of another user instead of not activating the processing as illustrated in FIG. 14.

Furthermore, in a case where vertical holding or horizontal holding is performed in the imaging apparatus 1 or the like, for example, information of the registration motion at the time of vertical holding may be rotated and used as data of the registration motion at the time of horizontal holding.

In addition, in a case where there are wrinkles between eyebrows even in a straight face state in the outdoors where sunlight or the like is glaring, it is conceivable to prevent malfunctions by changing a threshold value for determining a motion.

The straight face data corresponding to such a situation may be stored separately. Alternatively, the straight face may be updated, and the registration motion may be automatically corrected.

In addition, in a case where biological information such as heartbeat, sweating, or goosebumps can be acquired from the eye peripheral image or other sensors, a registration motion combined with the biological information may be stored.

11. Conclusion and Modifications

According to the above-described embodiments, the following effects can be obtained.

The information processing apparatus according to the embodiment is implemented as the imaging apparatus 1 or the terminal apparatus 100. Alternatively, it is realized as a processor having a function of the arithmetic unit 40.

The information processing apparatus according to such an embodiment includes a registration information acquisition unit 53 that acquires registration information in which a motion determined from the shapes of the eye and the periphery of the eye is associated with processing, an image acquisition unit 51 that acquires an eye peripheral image, a processing selection unit 52 that selects registration processing included in the registration information on the basis of the registration information and the eye peripheral image, and a control unit 54 that performs control such that the processing selected by the processing selection unit 52 (processing associated with the registration motion) is performed.

That is, the arithmetic unit 40 acquires the eye peripheral image and determines a motion (eye gesture) of the eyes and around the eyes. Then, registration processing associated with the registration motion matching the eye gesture in the registration information is selected, and the registration processing is controlled to be executed.

As a result, the user can perform an operation related to shooting or the like only with the eye gesture even in a state where the hand is occupied. Furthermore, the information processing apparatus can estimate a user's intention and perform operation auxiliary processing according to the user's intention.

In particular, the motion of the eye is determined including not only the eye but also the periphery of the eye. For example, not only the degree of opening of the eyes but also movement such as wrinkles around the eyes are used for identification. As a result, for example, even in same states where the eyes are closed, it is possible to identify whether the eyes are strongly closed or lightly closed. In addition, there are many pieces of information obtained from other than as the degree of opening of the eyes. Therefore, more various motions can be determined and associated with processing.

In addition, by performing determination including the periphery of the eyes, the eye gesture can be determined more accurately regardless of various eye shapes of people. For example, the motion of the eyes can be accurately determined regardless of whether the person has large eyes or thin eyes or the like.

Furthermore, by comparing the eye gesture with the registration motion, it is possible to distinguish between an eye gesture effective as an operation or the like and an invalid (unregistered) eye gesture as an operation or the like.

In the embodiment, an example has been described in which the processing selection unit 52 calculates the matching degree between the motion appearing in the eye peripheral image and the registration motion in the registration information, and selects the registration processing associated with the registration motion in which the matching degree satisfies a certain numerical value (threshold value) (see FIGS. 8, 13, and 16).

A matching degree between a motion observed in a plurality of frames as a moving image or a still image and each registration motion is determined, and a registration motion in which the matching degree is a certain threshold value or more is determined. Then, registration processing corresponding to the registration motion is selected. Accordingly, since the registration motion less than the threshold value is not selected, it is possible to determine a motion with high certainty among various motions.

In the embodiment, an example has been described in which the processing selection unit 52 calculates the matching degree between the motion appearing in the eye peripheral image and all the registration motions in the registration information, and selects the processing associated with the motion having the highest matching degree among the registration motions (see FIGS. 8, 13, and 16).

By calculating the matching degree with all the registration motions for the captured eye peripheral image, it is effective to prevent erroneous determination of the motion due to the original shape of the user's eyes. For example, the shape of the eye, size, thinness, eyelid state, the way the wrinkles form, and the like are different for each user, but the most probable registration motion can be determined according to the shape near the user's eye by comparing with all the registration motions.

In the first embodiment, an example has been described in which the processing selection unit 52 calculates the matching degree with the registration motion using the encoding information of the state in the certain period, which is obtained by determining and encoding the states of the eye and the periphery of the eye for each frame of the eye peripheral image, as the information of the motion appearing in the eye peripheral image (see FIG. 8).

For each frame, the "state" of the eye and the periphery of the eye is determined and encoded by processing such as class classification using a machine learning model. Then, the state (change in state) at each time point is referred to as "motion". By comparing the "motion" with the registration motion, a probable motion can be determined. In this way, by encoding each still image as a "state", a processing load can be extremely reduced as compared with a case where images of a plurality of frames are input to a DNN or the like and motion determination is performed.

In the second embodiment, an example in which the arithmetic unit 40 controls the notification to the user in a case where a plurality of motion candidates is obtained in the registration motion has been described (see FIG. 13).

For example, a notification that prompts a clearer eye gesture is made to the user. As a result, the accuracy of the operation recognition can be enhanced. Notification may be performed to request which of a plurality of items is selected.

In the second embodiment, an example has been described in which the arithmetic unit 40 controls the notification to the user in a case where the matching degree does not satisfy a certain numerical value (threshold value) for any of the registration motions when the matching degree between the motion appearing in the eye peripheral image and the registration motion is calculated (see FIG. 13).

For example, it is possible to improve the accuracy of the operation recognition by making a notification to prompt a clearer eye gesture to the user. Alternatively, a notification indicating that the maximum matching degree is selected although the matching degree is low may be made.

In the embodiment, an example has been described in which the registration information includes personal identification information for identifying an individual of the user (see FIG. 7).

According to the eye and the image around the eye, personal identification can be performed. When the personal identification information is included as the registration information, it is possible to cope with the personal identification of the user.

In the example described above, the processing selection unit 52 determines whether or not the acquired eye peripheral image is the eye peripheral image of the registered user on the basis of the personal identification information, and does not perform processing selection in a case where the user is not the registered user (see FIG. 14).

That is, if the user is not a registered user, the processing by the eye gesture is not activated. As a result, an eye gesture operation or the like can be performed only by the registered specific user. In other words, it is possible to prevent the user from being confused by activating the function at the time of use by the user who does not know the eye gesture function.

In the third embodiment, it is assumed that the registration information is associated with motions and processing determined from the eyes and the shapes around the eyes in association with the personal identification information. Then, an example has been described in which the processing selection unit 52 determines the motion and selects the processing using the information of the registration motion and the registration processing corresponding to the user identified on the basis of the personal identification information in the registration information (see FIGS. 7 and 14).

As a result, the eye gesture expressed by the eye peripheral image can be used as the registration motion for each user, and the accuracy of the determination can be improved. Calibration data can also be accumulated for each user.

In addition, an arbitrary operation can be registered as an eye gesture for each user. In addition, it is possible to set necessary auxiliary processing for each user.

As described above, even in an apparatus used by a plurality of users, the eye gesture corresponding processing suitable for each user can be performed.

In the embodiment, the eye peripheral image is an image including the shapes of the eyebrows or the shapes of the wrinkles around the eyes.

By including the shapes of the eyebrows and the wrinkles as the images of the eyes and the periphery of the eyes, it is possible to determine the eye gesture more accurately than the determination based only on the state of the eyes.

In particular, since the shape of the eye varies depending on the person, the opening degree of the eye, the closing degree of the eye, the emotion expression, and the like can be easily determined by including the shape of the eyebrow or the wrinkle.

In the embodiment, the registration processing selected by the processing selection unit 52 includes the operation corresponding processing according to the user's operation.

That is, the eye gesture is recognized as an "operation" such as a shutter operation, and the control unit 54 executes processing corresponding to the operation. As a result, the user can perform a conscious operation by the eye gesture.

In addition, the registration processing selected by the processing selection unit 52 includes the operation corresponding processing for the recording operation, the zoom-in operation, and the zoom-out operation of the captured image for the camera.

For example, an imaging operation can be performed as an eye gesture. The imaging operation is a shutter operation for capturing a still image, a recording start operation for capturing a moving image, or the like. Alternatively, a zoom operation such as zooming in or zooming out may be performed as an eye gesture.

Since these operations are relatively frequently performed, enabling these operations with an eye gesture is effective for improving operability.

In the embodiment, the registration processing selected by the processing selection unit 52 includes operation corresponding processing related to a specific operation image or an image specified by line-of-sight detection.

For example, an operation related to a specific operation image such as a mouse cursor or an icon, an icon specified by line-of-sight detection, or an image such as a still image, for example, a drag operation, an enlargement/reduction operation, or the like can be performed by an eye gesture. As a result, various operations as operations by the GUI can be performed by the eye gesture.

In the embodiment, the registration processing selected by the processing selection unit 52 includes corresponding processing to a situation estimated from the determined motion.

For example, as exemplified as various processing examples of the operation auxiliary system, it is possible to improve usability and convenience of the apparatus by performing corresponding processing that automatically handles a situation estimated from the determined motion. For example, the display luminance is lowered according to a glaring motion of the user or the like. This can be said to be processing corresponding to the unconscious eye gesture of the user.

In the fourth embodiment, an example has been described in which, in a case where a negative motion with respect to the execution of the control by the control unit 54 is determined from the eye peripheral image, the processing selection unit 52 selects the corresponding processing, and the control unit 54 performs control such that the corresponding processing is performed (see FIG. 15).

For example, in a case where some processing of the operation system or processing of the operation auxiliary system by an eye gesture is executed, the user may not be willing to perform the processing. A negative intention at that time is determined from the eyes and images around the eyes, and corresponding processing such as notification and cancellation is performed. As a result, it is possible to perform recovery in a case where the user recognizes an unintended operation.

Hereinafter, modifications and application examples of the technology of the present disclosure will be further described.

In the case of the imaging apparatus 1 or the terminal apparatus 100 on which the line-of-sight detection apparatus unit 41 is mounted, it is possible to identify an individual by holding the image to the left to right, or vertical depending on the shape of the eye determined from the eye peripheral image, and automatically switch calibration data for line-of-sight detection.

In the line-of-sight detection, a "reference point" and a "moving part (moving point)" of the eye are found, and the line of sight is detected from the position of the moving point with respect to the reference point. For example, in the corneal reflex method, the eye in a state where the cornea is irradiated with a point light source is captured, and the corneal curvature center obtained from the corneal reflection image (Purkinje image) is measured as a reference point and the moving point is measured as a pupil. Then, the line-of-sight direction is calculated from the positions of the moving point and the reference point. In order to perform such line-of-sight detection processing, calibration according to individual differences is required. Therefore, performing personal identification from the eye peripheral image and automatically switching calibration data for line-of-sight detection is effective for improving line-of-sight detection accuracy.

In addition, it is preferable to notify the user with a character or an icon at the time of switching.

For example, notification such as "Right eye has been detected, so the data has been switched to right eye data." "Data has been switched since vertical holding has been detected" is performed.

In a case where there is a negative reaction of the user such as frowning with respect to the notification, the switching may be canceled.

In a case where it is difficult to perform line-of-sight detection due to poor peeping at the time of line-of-sight detection, a guide notification can be displayed so as to correctly move the head position.

For example, in FIG. 18A, it is assumed that the user looks into the EVF 5 of imaging apparatus 1 from above, and it is difficult to detect the line of sight. Such a position of the head can be determined from the eye peripheral image. Therefore, as illustrated in FIG. 18B, the notification for the EVF 5 to be viewed from the front is performed by the display of the EVF 5. As a result, it can be expected that the user corrects the posture of the head as illustrated in FIG. 18C.

Such notification may be performed at the time of calibration of line-of-sight detection.

In the embodiment, the imaging apparatus 1 and the terminal apparatus 100 have been described as the information processing apparatus of the present technology. Since the region around the eye can be captured, the present technology can also be realized by the terminal apparatus 100 such as a smartphone or a PC.

Note that, in a smartphone or the like, since a camera showing the user himself/herself often has a wide angle, only an image around the eye is cut out using the face detection function, and the processing of the present embodiment is performed using the cut out image around the eye.

In a case where the technology of the present disclosure is applied to a smartphone, it is difficult to perform an operation since a housing is held with one hand at the time of selfie shooting. Therefore, it is possible to improve the usability by registering the motion and processing such as strongly closing one eye and performing the shutter processing after the end of the motion.

In the case of a PC, an operation is often performed with both hands, and gesture input by eyes is effective. For example, when eyes are opened and strongly closed during typing, a screenshot or the like is captured.

In addition, it may be combined with line-of-sight detection in a PC or the like.

For example, when the user stares at the pop-up notification, the notification immediately disappears.

Furthermore, when the user is surprised at the pop-up notification, details of the notification content are displayed.

In addition, when the eyes are strongly closed while viewing the disabled window, it is enabled.

The eye sensor camera 42 in the imaging apparatus 1 and the terminal apparatus 100 has an angle of view that covers the eyebrows from the center of the eye, and may have any configuration and any arrangement as long as the angle of view can be captured. A camera for other purposes such as eyepiece detection and line-of-sight detection may be used as the eye sensor camera 42.

Furthermore, a distance measuring sensor, a pressure sensor, a touch sensor, or the like may be installed in a device as the imaging apparatus 1 or the terminal apparatus 100, and the motion of the facial expression muscles may be detected and used for the determination of the eye gesture.

In addition, an enable/disable switch of input by an eye gesture may be provided as a physical operation element or an operation element on a system.

When the eye gesture input is invalidated by the user after determining a certain registration motion/registration processing, it is also appropriate to determine that the determination is wrong and perform the learning processing.

The program according to the embodiment is a program for causing a processor such as a CPU or a DSP, or a device including the processor to execute the above-described processing illustrated in FIGS. 8, 13, 14, 15, and 16.

That is, the program according to the embodiment is a program for causing an information processing apparatus to execute a procedure of acquiring registration information in which a motion determined from the shapes of the eye and the periphery of the eye and processing are associated with each other, a procedure of acquiring an eye peripheral image, a procedure of selecting registration processing included in the registration information on the basis of the registration information and the eye peripheral image, and a procedure of controlling the selected processing to be performed.

With such a program, the information processing apparatus that executes the processing of the arithmetic unit 40 described above can be realized by various computer apparatuses.

Such a program can be recorded in advance in an HDD as a recording medium built in a device such as a computer apparatus, a ROM in a microcomputer having a CPU, or the like. Furthermore, such a program can be temporarily or permanently stored (recorded) in a removable recording medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable recording medium can be provided as so-called package software.

Furthermore, such a program may be installed from the removable recording medium into a personal computer and the like, or may be downloaded from a download site through a network such as a local area network (LAN) or the Internet.

Furthermore, such a program is suitable for providing the information processing apparatus according to the embodiment in a wide range. For example, by downloading the program to a personal computer, a communication device, a portable terminal apparatus such as a smartphone or a tablet, a mobile phone, a game device, a video device, a personal digital assistant (PDA), or the like, these apparatuses can be caused to function as the information processing apparatus of the present disclosure.

Note that the effects described in the present specification are merely examples and are not limited, and other effects may be provided.

Note that the present technology can also have the following configurations.

(1)

An information processing apparatus including:

a registration information acquisition unit that acquires registration information in which a motion determined from shapes of an eye and a periphery of the eye and processing are associated with each other;

an image acquisition unit that acquires an image of the eye and the periphery of the eye;

a processing selection unit that selects the processing included in the registration information on the basis of the registration information and the image; and a control unit that performs control such that the processing selected by the processing selection unit is performed.

(2)

The information processing apparatus according to (1), in which the processing selection unit is configured to calculate a matching degree between the motion appearing in the image and the motion in the registration information, and select the processing associated with the motion in which the matching degree satisfies a certain numerical value.

(3)

The information processing apparatus according to (1) or (2), in which the processing selection unit is configured to calculate a matching degree between the motion appearing in the image and all the motions in the registration information, and select the processing associated with the motion having a highest matching degree among the motions registered.

(4)

The information processing apparatus according to any one of (1) to (3), in which the processing selection unit is configured to calculate a matching degree with the motion in the registration information, determine the motion on the basis of the matching degree, and select the processing associated with the motion determined, with encoding information of a state in a certain period, the state being obtained by determining and encoding a state of the eye and the periphery of the eye for each frame of the image, as information of the motion appearing in the image.

(5)

The information processing apparatus according to any one of (1) to (4), in which in a case where the processing selection unit determines the motion on the basis of a matching degree between the motion appearing in the image and the motion in the registration information and selects the processing associated with the motion determined, and control of notification to a user is performed when a plurality of motion candidates is obtained.

(6)

The information processing apparatus according to any one of (1) to (5), in which in a case where the processing selection unit determines the motion on the basis of a matching degree between the motion appearing in the image and a certain motion in the registration information and selects the processing associated with the motion determined, and control of notification to a user is performed in a case where the matching degree does not satisfy a certain numerical value for any of the motions in the registration information.

(7)

The information processing apparatus according to any one of (1) to (6), in which the registration information includes personal identification information for identifying an individual of a user.

(8)

The information processing apparatus according to (7), in which the processing selection unit is configured to determine whether or not the image is an image of a user registered on the basis of the personal identification information, and not perform selection of the processing in a case where the image is not the user registered.

(9)

The information processing apparatus according to (7) or (8), in which in the registration information, the motion and the processing determined from the shapes of the eye and the periphery of the eye are associated with each other in correspondence with the personal identification information, and the processing selection unit determines the motion and selects the processing by using information of the motion and the processing corresponding to a user identified on the basis of the personal identification information in the registration information.

(10)

The information processing apparatus according to any one of (1) to (9), in which the image of the eye and the periphery of the eye is an image including shapes of eyebrows or shapes of wrinkles around the eye.

(11)

The information processing apparatus according to any one of (1) to (10), in which the processing selected by the processing selection unit includes operation corresponding processing according to a user's operation.

(12)

The information processing apparatus according to any one of (1) to (11), in which the processing selected by the processing selection unit includes operation corresponding processing for at least one operation of a recording operation, a zoom-in operation, and a zoom-out operation of a captured image for a camera.

(13)

The information processing apparatus according to any one of (1) to (12), in which the processing selected by the processing selection unit includes operation corresponding processing related to a specific operation image or an image specified by line-of-sight detection.

(14)

The information processing apparatus according to any one of (1) to (13), in which the processing selected by the processing selection unit includes corresponding processing for a situation estimated from the motion determined.

(15)

The information processing apparatus according to any one of (1) to (14), in which the processing selection unit selects corresponding processing in a case where a negative motion with respect to execution of control by the control unit is determined from the image, and the control unit performs control to perform the corresponding processing.

(16)

An information processing method in which an information processing apparatus is configured to acquire registration information in which a motion determined from shapes of an eye and a periphery of the eye and processing are associated with each other;

acquire an image of the eye and the periphery of the eye;

select the processing included in the registration information on the basis of the registration information and the image; and perform control to perform the processing selected.

(17)

A computer-readable storage medium storing a program for causing an information processing apparatus to execute:

a procedure of acquiring registration information in which a motion determined from shapes of an eye and a periphery of the eye and processing are associated with each other;

a procedure of acquiring an image of the eye and the periphery of the eye;

a procedure of selecting the processing included in the registration information on the basis of the registration information and the image; and a procedure of performing control such that the processing selected is performed.

REFERENCE SIGNS LIST

1 Imaging apparatus
5 EVF
18 Camera control unit
19 Memory unit
40 Arithmetic unit
41 Line-of-sight detection apparatus unit
42 Eye sensor camera
43 Sensor unit
51 Image acquisition unit
52 Processing selection unit
52*a* Encoding unit
52*b* Matching degree calculation unit
52*b* Selection unit
53 Registration information acquisition unit
53*a* Registration motion acquisition unit
53*b* Registration processing acquisition unit
54 Control unit
55 Storage unit
71 CPU
100 Terminal apparatus

The invention claimed is:

1. An information processing apparatus, comprising:

central processing unit (CPU) configured to:

acquire registration information that includes association of a first a motion with a processing, wherein the first motion is based on a shape of an eye and a periphery of the eye;

acquire an image of each of the eye and the periphery of the eye;

encode a state of the eye and the periphery of the eye for each frame of a plurality of frames of the acquired image;

determine information of a second motion in the acquired image, based on the encoded state;

calculate a matching degree between the first motion and the second motion;

determine that the second motion in the acquired image corresponds to the first motion based on the matching degree;

select the processing based on the determination that the second motion corresponds to the first motion; and execute the selected processing.

2. The information processing apparatus according to claim 1, wherein the CPU is further configured to select the processing associated with the first motion in based on the matching degree that satisfies a certain numerical value.

3. The information processing apparatus according to claim 1, wherein the CPU is further configured to:

register a plurality of motions that includes the first motion;

calculate a plurality of matching degrees, including the matching degree, for the registered plurality of motions, wherein each of the plurality of matching degrees is calculated between the second motion in the image and a respective motion of the plurality of motions; and select the processing associated with the first motion based on the first motion that has a highest matching degree among the plurality of matching degrees for the registered plurality of motions.

4. The information processing apparatus according to claim 1, wherein the CPU is further configured to:

register a plurality of motions that includes the first motion;

determine a set of motions from the registered plurality of motions, based on a plurality of matching degrees between the second motion in the image and the registered plurality of motions, wherein the plurality of matching degrees includes the matching degree; and control display of a notification a based on the determined set of motions, wherein the notification is displayed to notify a user.

5. The information processing apparatus according to claim 1, wherein the CPU is further configured to:

register a plurality of motions that includes the first motion;

calculate a plurality of matching degrees, including the matching degree, for the registered plurality of motions, wherein each of the plurality of matching degrees is calculated between the second motion in the image and a respective motion of the plurality of motions;

determine that each of the plurality of matching degrees is below a specific numerical value; and control display of a notification based on the determination that the each of the plurality of matching degrees is below the specific numerical value, wherein the notification is displayed to notify a user.

6. The information processing apparatus according to claim 1, wherein the registration information includes personal identification information to identify a user.

7. The information processing apparatus according to claim 6, wherein the CPU is further configured to:

determine whether the image corresponds to the user based on the personal identification information; and prevent the selection of the processing in a case where the image does not correspond to the user.

8. The information processing apparatus according to claim 6, wherein in the registration information, the first motion is associated with the processing in correspondence with the personal identification information, and the CPU is further configured to:

identify the user based on the personal identification information; and determine the first motion corresponding to the identified user.

9. The information processing apparatus according to claim 1, wherein the image includes at least one of shapes of eyebrows or shapes of wrinkles around the eye.

10. The information processing apparatus according to claim 1, wherein the processing includes a process according to a user's operation.

11. The information processing apparatus according to claim 1, wherein the processing includes at least one operation of a recording operation, a zoom-in operation, or a zoom-out operation of the image, and the image is captured by a camera.

12. The information processing apparatus according to claim 1, wherein the processing includes operation related to one of a specific operation image or a specific image associated with detection of a line-of-sight.

13. The information processing apparatus according to claim 1, wherein the CPU is further configured to:

estimate a situation based on the first motion; and select the processing for the estimated situation.

14. The information processing apparatus according to claim 1, wherein the CPU is further configured to:

determine a negative motion with respect to the execution of the selected processing;

select a specific process based on the determined negative motion; and execute the selected specific process.

15. An information processing method, comprising:

acquiring registration information that includes association of a first-in motion with a processing, wherein the first motion is based on a shape of an eye and a periphery of the eye;

acquiring an image of each of the eye and the periphery of the eye;

encoding a state of the eye and the periphery of the eye for each frame of a plurality of frames of the acquired image;

determining information of a second motion in the acquired image, based on the encoded state;

calculating a matching degree between the first motion and the second motion;

determining that the second motion in the acquired image corresponds to the first motion based on the matching degree;

selecting the processing based on the determination that the second motion corresponds to the first motion; and executing the selected processing.

16. A non-transitory computer-readable medium having stored thereon, computer-executable instructions which, when executed by an information processing apparatus, cause the information processing apparatus to execute operations, the operations comprising:

acquiring registration information that includes association of a first motion with a processing, wherein the first motion is based on a shape of an eye and a periphery of the eye;

acquiring an image of each of the eye and the periphery of the eye;

encoding a state of the eye and the periphery of the eye for each frame of a plurality of frames of the acquired image;

determining information of a second motion in the acquired image, based on the encoded state;

calculating a matching degree between the first motion and the second motion;

determining that the second motion in the acquired image corresponds to the first motion based on the matching degree;

selecting the processing based on the determination that the second motion corresponds to the first motion; and executing the selected processing.

* * * * *